US006810303B2

(12) United States Patent
Sagae et al.

(10) Patent No.: US 6,810,303 B2
(45) Date of Patent: Oct. 26, 2004

(54) INJECTION MOLD, A PRODUCTION METHOD THEREOF, A PRODUCTION SYSTEM THEREOF, A DESIGNING APPARATUS AND A DESIGNING COMPUTER PROGRAM THEREOF, AN INJECTION METHOD, A MOLDED COMPONENT, AND AN OPTICAL SYSTEM THEREWITH

(75) Inventors: Eiri Sagae, Kanagawa (JP); Hiroyuki Endoh, Kanagawa (JP); Yasuo Yamanaka, Kanagawa (JP); Toshiyuki Iseki, Kanagawa (JP); Kohei Shimbo, Kanagawa (JP); Yutaka Kaneko, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 317 days.

(21) Appl. No.: 10/172,983

(22) Filed: Jun. 18, 2002

(65) Prior Publication Data

US 2003/0018408 A1 Jan. 23, 2003

(30) Foreign Application Priority Data

Jun. 19, 2001 (JP) .................................... 2001-185547
Mar. 20, 2002 (JP) .................................... 2002-077509

(51) Int. Cl.⁷ .......................... G06F 19/00; B29C 47/92
(52) U.S. Cl. ...................................... 700/204; 425/137
(58) Field of Search ............................ 65/29.1–29.12, 65/377, 401–405; 264/40.1–40.7; 425/135, 137, 169; 700/28–31, 97, 98, 196–205; 703/1, 2

(56) References Cited

U.S. PATENT DOCUMENTS

| 5,243,665 | A | * | 9/1993 | Maney et al. ................ 382/152 |
| 5,868,607 | A |  | 2/1999 | Enomoto et al. ............. 451/56 |
| 5,898,591 | A | * | 4/1999 | Hettinga et al. ............ 700/204 |
| 5,928,578 | A | * | 7/1999 | Kachnic et al. ............ 264/40.1 |
| 6,051,170 | A | * | 4/2000 | Kamiguchi et al. ........ 264/40.1 |
| 6,117,001 | A |  | 9/2000 | Enomoto et al. .......... 451/541 |
| 6,592,354 | B2 | * | 7/2003 | Kachnic et al. ............. 425/169 |
| 6,592,355 | B2 | * | 7/2003 | Kachnic ..................... 425/169 |
| 6,699,413 | B2 | * | 3/2004 | Kachnic .................... 264/40.1 |
| 2002/0068106 | A1 | * | 6/2002 | Kachnic et al. ............. 425/139 |
| 2003/0194460 | A1 | * | 10/2003 | Watanabe et al. ........... 425/137 |

FOREIGN PATENT DOCUMENTS

| JP | 63-126718 A | * 11/1986 |
| JP | 2898197 | 3/1999 |
| JP | 2000-263391 | 9/2000 |
| JP | 2001-62871 | 3/2001 |

* cited by examiner

Primary Examiner—Maria N. Von Buhur
(74) Attorney, Agent, or Firm—Oblon, Spivak, McClelland, Maier & Neustadt, P.C.

(57) ABSTRACT

An injection mold that is capable of producing a final molded component that meets designed optical properties is designed and produced efficiently by measuring shape errors, which adversely affect the optical properties, of at least one of a surface shape of a cavity of a first molding part and a molded component produced by using the first molding part, by reducing at least one of wavelength components of the shape errors, by generating processing information that is used to produce a second molding part that is used to mold the final molded component.

29 Claims, 32 Drawing Sheets

```
X1.20Y0.00W0.061
X1.20Y0.08W0.063
X1.20Y0.17W0.063
X1.20Y0.27W0.063
X1.20Y0.38W0.063
X1.20Y0.50W0.063
```

(POLISHING LOAD)

(MOLDING PART)

AR (UNPOLISHED AREA)

PROCESSING MARK BY CUTTING TOOL

PROCESSING MARK BY POLISHING TOOL

INJECTION MOLD, A PRODUCTION METHOD THEREOF, A PRODUCTION SYSTEM THEREOF, A DESIGNING APPARATUS AND A DESIGNING COMPUTER PROGRAM THEREOF, AN INJECTION METHOD, A MOLDED COMPONENT, AND AN OPTICAL SYSTEM THEREWITH

BACKGROUND OF THE INVENTION

1. Field of the Invention

The present invention generally relates to an injection mold, a production method thereof, a production system thereof, a designing apparatus and a designing computer program thereof, an injection method, a molded component, and an optical system therewith, and specifically relates to an injection mold of precision components such as a plastic lens, a production method thereof, a production system thereof, a designing apparatus and a designing computer program thereof, an injection method using the injection mold, a molded component produced by the injection mold, and an optical system that is equipped with an optical component that includes the molded component.

2. Description of the Related Art

Optical components, such as a lens, are often made of resin, such as plastics, due to a low cost and lightweight. Most of the optical components are produced by an injection molding, and the like. A method of the injection molding uses an injection mold that has a cavity in a shape according to a product to be produced. A surface of the molding part is processed such that the cavity can be formed based on the shape of the product (design shape).

Then, melted and pressurized resin is injected to the cavity of the mold using an injection molding machine, and the like. After the resin is cooled, solidified resin is separated from the mold, and the product of the shape according to the surface shape of the molding part is obtained.

As for the resin for the injection molding, thermal plastics, such as amorphous polyolefin resin and acrylic resin (PMMA), are often used in the case of production of optical components. The resin is heated to 200 degrees C. or higher to be melted, and is injected to the injection mold while it is melted. For this reason, the molded product is subject to contraction when the injected resin solidifies, and further cooled to room temperature. Dimensions of the product tend to be smaller than the dimensions of the mold cavity. Then, in order to compensate the contraction, the contraction is estimated in advance by approximating the contraction by an inverse of isotropic deformation ratio (contraction ratio), and is applied to design of the cavity, i.e., the surface of the molding part.

The optical components are widely applied to a laser beam printer, a digital reproducing machine (copying machine) and the like, in view of economical prices. Recently, a demand for a high quality image has been increasing, which requires a high precision of the optical components used in an optical scanning system that greatly influences the image quality, while keeping the low costs. Therefore, a demand for a high precision and a low cost plastic optical component is increasing.

A product molded by the injection molding contains an uneven internal stress due to an unevenness of a cooling speed, an unevenness of resin temperature, and an asymmetry of the shape of the product. The internal stress causes an uneven deformation (strain). Further, a production error of the molding part cannot be disregarded. For these reasons, an actual deformation of the products is caused not only by a proportional contraction, but also by other periodical deformations that contain various frequency components. Therefore, it has been difficult to produce a high precision molded component that satisfies required properties (such as optical properties) by designing the cavity and the surface in precaution of only the isotropic contraction. This indicates that a process and a production method that consider various deformations occurring in the molded component are desired, such that a molded component that realizes designed properties is produced.

In order to control dimensions and a sphere of the molded component within predetermined tolerances, a practice has been that the shape of the molded component is measured to obtain shape data, the shape data is compared with designed dimensions, errors are determined, and the surface of the molding part is processed to correct the errors.

For convenience of computer processing, a polynomial (a shape regression) is widely used to approximate an amount of compensation from the shape data, because processing and production of the molded part are often performed by a processing apparatus managed and controlled by a computer. This approximation process not only interpolates values at an unmeasured point, but also extracts a low frequency component (a long wavelength component), that is, it has a low pass filter effect.

However, sometimes, designed properties were not obtained even after correcting the errors based on the long wavelength component contained in the shape data. Then, studies were made about shorter wavelength components (undulations).

For example, Japanese Laid-Open Patent Application No. 2000-263391 (hereinafter referred to as the first public knowledge) reveals a method in which a wavelength of a representative undulation component of a molded component is obtained, and removed. This method does not use a process of acquiring data from a polynomial, such as the shape regression, but performs a frequency analysis, such as the Fourier analysis, and extracts the undulation component.

Further, Japanese Laid-Open Patent Application No. 2001-62871 (hereinafter referred to as the second public knowledge) reveals a method of acquiring a compensation amount by a shape formula (a polynomial or a shape regression) that expresses a simulated figure considering a contraction ratio, and by extracting an undulation component.

Furthermore, Japanese Patent Publication No. 2898197 (hereinafter referred to as the third public knowledge) reveals a molding method that offsets shape errors, based on an approximation formula of a polynomial. In applying the approximation formula, an optically functional area of an optical component produced under stable molding conditions is divided into a plurality of areas. Then, the formula is applied to each of the areas, and continuity is provided to each boundary of the areas.

The first public knowledge is capable of identifying a wavelength of a governing undulation component, however, it is not capable of separating the undulation component from the shape of the molded component, and it is not capable of extracting sufficient information regarding an amplitude of the undulation component. For this reason, the first public knowledge cannot be applied to a method that provides a compensation amount varying from point to point in a corrective process. The first public knowledge uses elasticity and viscosity of a processing tool in order to remove the undulation component. However, in the case of processing a surface with varying curvatures, a concordance of a processing tool with an object of the process is a prerequisite. That is, the elasticity of the processing tool has to be low, which causes an insufficient removal of the undulation component. The second public knowledge considers a comparatively short wavelength component that is not included in a conventional shape regression, however, there is a possibility that a compensation amount contains an unnecessary high frequency component that is irrelevant to properties (such as optical properties) that are to be enhanced. This causes a process to become unstable and inefficient, depending on response characteristics of a processing apparatus. Further, this method applies a uniform contraction ratio regardless of wavelength, and for this reason, accuracy at an important wavelength tends to be low.

In FIG. 31, an example is presented, where the molded component is a scanning lens of a polygon scanner optical system of a laser beam printer. The polygon scanner optical system shown in FIG. 31 includes a semiconductor laser S1 as a light source, a collimator lens S2, a polygon mirror S3, a scanning lens S4, and a photo conductor S5. A light flux emitted from the semiconductor laser S1 passes through the collimator lens S2, and irradiates the polygon mirror S3. The light flux is deflected by rotation of the polygon mirror S3, passes through the scanning lens S4, and is focused near an image surface where the photo conductor device S5 is located.

If a shape error S6 is present in the surface of the scanning lens S4, a focal deviation S7 will arise in the image surface, due to a local lens effect of the shape error S6. If an amount of the focal deviation S7 is large, a beam spot is blurred at the image surface, causing picture quality degradation. Here, a relationship between a space wavelength of the shape error S6 and the focal deviation S7 is examined, where amplitude of the shape error S6 is assumed constant.

As the first case, the space wavelength of the shape error S6 is supposed to be sufficiently longer than a diameter D of the light flux that passes through the scanning lens S4. Then, since the curvature of the lens is small for the long wavelength, the amount of the focal deviation is small.

As the second case, the space wavelength of the shape error S6 is supposed to be sufficiently shorter than the diameter D of the light flux. In this case, the curvature of the lens for the short wavelength may be large, however, an optical effect of the curvature is averaged within limits of the diameter D of the light flux. As a result, the amount of the focal deviation is small.

As the third case, the space wave length of the shape error S6 is supposed to be similar to the diameter D of the light flux. In this case, the curvature is large, and the averaging effect cannot be expected. Therefore, the focal deviation in this case is larger than that of the first case and the second case. In summary, when the space wavelength of the shape error S6 that is present on the surface of the scanning lens S4 is similar to the diameter D of the light flux that passes through the scanning lens S4, an influence of the shape error to the amount of focal deviation is the greatest, causing a significant deterioration of the image quality.

For reasons such as above, there are many cases where a larger tolerance is allowable for a longer wavelength, however, a stricter tolerance should be observed for a shorter wavelength. For example, in the case of a 100 mm long lens, a 1$\mu$m tolerance may be given to a wavelength component of 50 mm, while only 0.05 $\mu$m tolerance can be allowed to a wavelength component of 1 mm.

The third public knowledge has a problem that an accurate feedback to processing data of short wavelength components, such as undulations, contained in the shape error is difficult. Further, the third public knowledge does not consider the contraction ratio, causing insufficient removal of the error. With demands for a high image quality of the laser printers and the like, optical components that surely realize designed performances are needed. It is envisaged that the conventional methods will not be able to meet the demands.

SUMMARY OF THE INVENTION

It is a general object of the present invention to provide an injection mold, a production method thereof, a production system thereof, a designing apparatus and a designing computer program thereof, an injection method, a molded component, and an optical system therewith that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by The present invention generally relates to an injection mold, a production method thereof, a production system thereof, a designing apparatus and a designing computer program thereof, an injection method, a molded component, and an optical system therewith particularly pointed out in the specification in such full, clear, concise, and exact terms as to enable a person having ordinary skill in the art to practice the invention.

More specifically, the objectives of the present invention are offering:

a production method and a production system that produce an injection-mold that is suitable for producing a molded component that surely realizes designed properties;

an injection mold that is capable of stably producing the molded component that surely realizes the designed properties, and a molding method using the injection mold;

a designing apparatus and a designing computer program that enable designing of the injection mold that is suitable for producing the molded component that surely realizes the designed properties;

a molded component with excellent component properties, and an optical component with excellent optical properties; and an optical system that has excellent scanning accuracies.

To achieve these and other advantages and in accordance with the purpose of the invention, as embodied and broadly described herein, the invention provides the injection mold, the production method thereof, the production system thereof, the designing apparatus and the designing computer program thereof, the injection method, the molded component, and the optical system therewith, as follows.

The present invention provides the production method of an injection mold that has a mold cavity of a predetermined shape, surface shape of the cavity being copied to a molding material such that a molded component is produced, wherein a first process extracts a plurality of wavelength components of shape errors contained in the molded component based on at least one of the surface shape of the cavity of a first molding part and the molded component produced by the first molding part, and a second process generates processing information that is used in processing the surface shape of the cavity of a second molding part such that an amount of at least one of the wavelength components of the shape errors is reduced.

Here, the first molding part and the second molding part may be physically different objects, or the first molding part that has been reworked according to the above process may be made the second molding part.

At the first process, the plurality of the wavelength components that give adverse affects to the properties of the molded component are extracted.

Since the second process generates the processing information such that at least one of the wavelength components that give the adverse effects to the properties of the molded component is selectively removed, processing of the surface shape of the second molding part, it is checked whether newly produced or the first molding part being reworked, can be performed more efficiently and accurately than the conventional method that uses a uniform contraction ratio.

In this manner, an efficient production of an injection mold that is suitable for producing a molded component that surely realizes designed properties is possible.

Here, the plurality of the wavelength components may include a first wavelength component and a second wavelength component.

In this case, the second wavelength component is extracted based on the surface shape of the cavity of the first molding part, and the first wavelength component is extracted based on the shape of the molded component. Alternatively, both the first and the second wavelength components may be extracted from one of the first molding part and the molded component. Further, alternatively, the first wavelength component may be extracted from the surface shape of the cavity of the first molding part, while the second wavelength component is extracted based on the shape of the molded component.

Further, in this case, the first wavelength component (the wavelength component extracted based on the surface shape of the cavity of the first molding part) may be set shorter than the second wavelength component (the wavelength component extracted based on the shape of the molded component).

In the first process, the first wavelength component may be extracted from shape errors along a first direction, while the second wavelength component is extracted from shape errors along a second direction that is different from the first direction. In this case, the first direction and the second direction may be set orthogonal.

In the first process, shape errors may be interpolated based on shape errors measured at a plurality of measuring points.

In the first process, a third wavelength component may be extracted in addition to the first and the second wavelength components, and the second process may be configured such that the processing information is generated in order to reduce at least one of the first, the second and the third wavelength components. Further, in this case, the first and the second wavelength components may be extracted from the shape errors along the first direction, while the third wavelength component is extracted from the shape errors along the second direction that is different from the first direction.

Further, the first wavelength component may be set as longer than 10 mm and obtained based on the shape of the molded component produced using the first molding part, and the second wavelength component may be set as shorter than 20 mm and obtained based on the surface shape of the cavity of the first molding part, while the third wavelength component is an error component of the radius of curvature (radius of curvature error) obtained based on the shape of the molded component produced using the first molding part.

Further, in the first process, a wavelength component obtained as a difference between a polynomial obtained from measurement values of the shape of the molded component and a designed polynomial, and a wavelength component obtained as a band-pass-filtered error between the measurement values of the cavity of the first molding part and a polynomial obtained from the measurement values may be extracted.

In the second process, the processing information by which the surface shape of the cavity of the second molding part is processed may be generated based on an amount of compensation (compensation amount) obtained using a compensation amount based on at least one of the wavelength components of the molded component produced using the first molding part, and using a contraction ratio of the molding material at least in one direction.

Where the compensation amount z is expressed as $z=f(x, y)$ on an XYZ rectangular coordinate system, the compensation amount for the surface shape of the cavity of the first molding part can be expressed as one of $z_k = -f(-m_x x, m_y y)/m_z$ and $z_k = -f(m_x x, -m_y y)/m_z$, where, $m_x$, $m_y$, and $m_z$ are contraction ratios in X, Y and Z-directions, respectively.

The present invention may include a third process that processes the surface shape of the cavity of the second molding part, based on the process information generated at the second process. Here, the second molding part may be the same as or different from the first molding part that was used in generating the processing information.

In the third process, the surface shape of the cavity of the first molding part may be processed, and made the second molding part. That is, the second molding part may be the first molding part the surface of the cavity of which is reworked.

The third process may employ at least one of a cutting process by a single crystal diamond byte, and a polishing process where a polishing tool contacts the surface to be processed through an area that is smaller than 3 mm in diameter.

The injection mold of the present invention is produced according to the production method of the present invention.

The injection mold of the present invention is produced by reducing an amount of at least one of the wavelength components of the shape errors. As the result, a molded component produced using the injection mold surely realizes properties that are designed.

The molding method of the present invention is characterized by transcribing the surface shape of the cavity of the molding part of the injection mold, under predetermined molding conditions at which a shape of the molded component is stably obtained, using the injection mold of the present invention.

By the molding method, molding is performed by using the injection mold that is processed by the processing information that is configured to selectively reduce at least one of the wavelength components of the shape errors that adversely affect the properties of the molded component, under the predetermined molding conditions that stably provide the shape of the molded component. In this manner, the molded component that surely realizes the designed properties can be produced stably.

The designing apparatus of the present invention is configured to produce an injection mold that has a cavity of a predetermined shape, surface shape of the cavity being copied to a molding material in order to produce a molded component, and includes a shape inputting means, an error component extracting means and a processing information generating means.

The shape inputting means is configured to input at least one of the surface shape of the cavity of the molding part, and the shape of the molded component to which the surface shape is copied.

The error component extracting means extracts a plurality of wavelength components of shape errors, based on measurement.

The processing information generating means generates processing information such that, when the surface shape of the cavity of the molding part is processed using the processing information, at least one of the wavelength components extracted is reduced. In this manner, the process using the processing information realizes a more efficient production of a higher precision surface shape of the cavity of the molding part than the conventional process that is based on applying a uniform contraction ratio to allover the surface shape.

Therefore, according to the present invention, the injection mold that is suitable for producing the molded component that surely realizes the designed properties can be efficiently designed.

Therefore, according to the present invention, the injection mold that is suitable for producing the molded component that surely realizes the designed properties can be efficiently designed.

The present invention provides a computer program that is executed by a computer such that an injection mold that has a mold cavity of a predetermined shape, a surface shape of the cavity being copied to a molding material in order to produce a molded component, is designed. The computer program includes an extracting step that extracts a plurality of wavelength components of shape errors contained in at least one of the surface shape of the cavity of the molding part and the molded component produced by the injection mold, and a processing data generating step that generates processing data with which the surface shape of the cavity of the molding part is processed such that an amount of at least one of the wavelength components is reduced.

At the extracting step, the wavelength components of the shape errors contained in the molded component are extracted based on at least one of the surface shape of the cavity of the molding part and the molded component that copies the surface shape. Then, processing data is generated, at the processing data generating step, such that a process using the processing data reduces an amount of at least one of the wavelength components extracted. Since a wavelength component that adversely affects the properties of the molded component is selectively reduced by the present invention, a more efficient and a more accurate designing of the surface shape of the cavity of the molding part becomes possible, than by the conventional manner.

Accordingly, the computer program provided by the present invention realizes an efficient designing of an injection mold that is suitable for producing a molded component that surely realizes designed properties.

The present invention provides the production system that is configured to produce an injection mold that has a mold cavity of a predetermined shape, surface shape of the cavity being copied to a molding material in order to produce a molded component. The production system includes a processing information generating unit and a processing apparatus.

In the production system, a wavelength component of shape errors contained in the molded component, which adversely affects the properties of the molded component, is selectively reduced. The processing information may be transmitted to the processing apparatus through a network and the like.

The production system processes based on the processing information, such that a more efficient production of the injection mold is realized, the injection mold possessing a higher precision surface shape of the cavity of the molding part than the conventional system that applies a uniform contraction ratio.

In this manner, the present invention efficiently provides the production system of the injection mold that realizes designed properties.

The production system may also include a shape measuring unit that measures one of the surface shape of the cavity of the first molding part and the molded component produced by the first molding part. Results measured by the shape measuring unit are transmitted to the information generating unit via the network, and the like.

The present invention provides the molded component that is produced by copying the surface shape of the cavity of the molding part to a molding material using the injection mold.

Since the injection mold that is produced by selectively reducing a wavelength component that adversely affects the properties of the molded component, the molded component of the present invention can surely realize designed properties.

The present invention provides an optical component that is produced by copying the surface shape of the cavity of the molding part to a molding material using the injection mold.

Since the injection mold that is produced by selectively reducing a wavelength component that adversely affects the properties of the optical component, the optical component of the present invention can surely realize designed optical properties.

The optical component may include a plurality of sets of processing marks copied on the molding material.

In this case, the optical component may include a first set of the processing marks at a peripheral of an optical surface in a longitudinal direction, and a second set of the processing marks in a finer pitch than the first set of the processing marks at a predetermined angle in reference to the longitudinal direction in an area inside the first processing marks.

An absolute value of a shape error A of the optical component can be set within a range of $0.00001 \, xW <= A <= 0.0005 \, xW$, where A represents the absolute value of the shape error in a band-pass-filtered wavelength range between 0.5 D and 1.5 D, where D represents a diameter of an area of the light flux, the area having a light intensity greater than $1/e^2$, where 1 is the light intensity at the center of the light flux, and W represents a diameter of the light flux at a focal point when the light flux characterized by the diameter D is input.

In this case, an attenuation ratio of the band-pass filter can be set at smaller than −12 dB/ octave.

The present invention provides an optical system that includes an optical scanning system that scans a scanning object with a light beam, or a light flux, from a light source. The optical scanning system includes a deflection unit that deflects the light from the light source in a predetermined range of angles, and an optical unit that includes at least an optical component of the present invention in an optical path from the deflection unit to the scanning object.

Accordingly, the optical system uses the optical component of the present invention, which can realize designed optical properties, therefore, the optical system can perform an accurate scanning of the light from the deflection unit on the scanning object. As the result, the scanning accuracy of the optical system is enhanced.

Various applications of the optical system are conceivable. The optical system can make an image forming apparatus, wherein the scanning object is an image-bearing object on which an image is formed by scanning the light through the optical system, possibly further provided with a copying unit.

DESCRIPTION OF THE PREFERRED EMBODIMENTS

In the following, embodiments of the present invention will be described with reference to the accompanying drawings.

First, the production method of an injection mold of the present invention is explained. Hereafter, a first embodiment of the present invention is explained based on FIGS. 1 through 15.

Figure 1A:
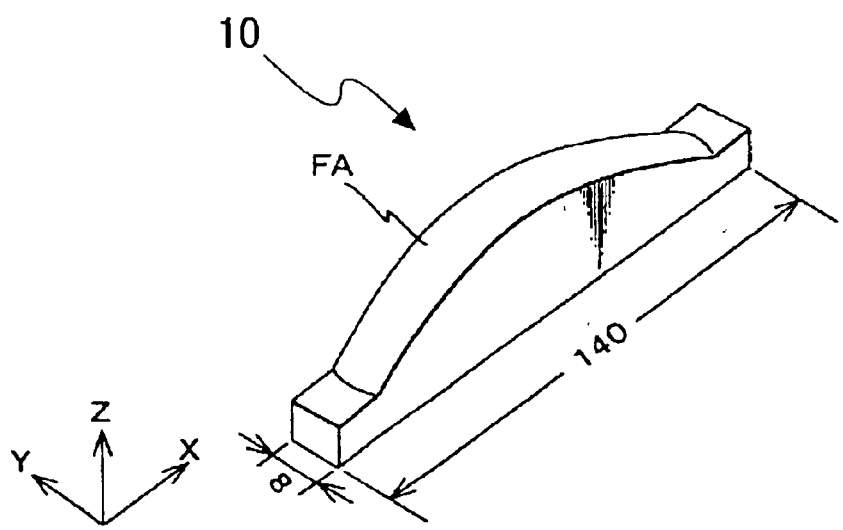
FIG. 1A is a perspective view of an optical component (lens) that is molded according to an embodiment of the present invention.
Figure 1B:
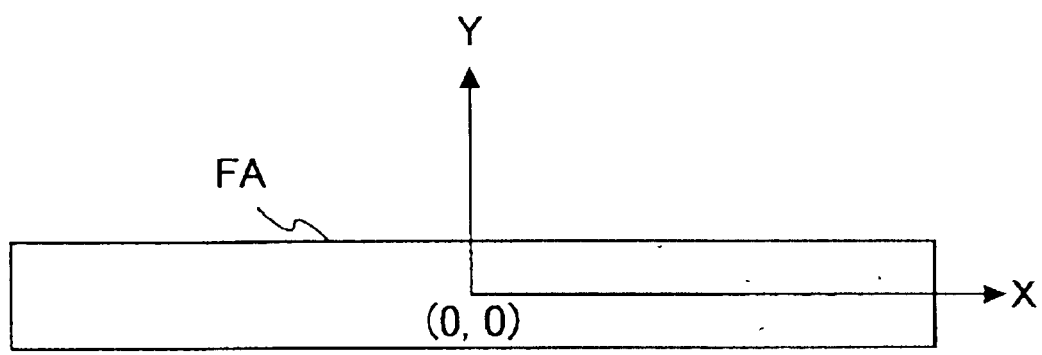
FIG. 1B is a plan view of the optical component shown in FIG. 1A showing an origin of an X-Y plane.

An external appearance of an optical component 10 that is molded using an injection mold produced by a production method of the present invention is shown in FIG. 1A. The optical component 10 is a scanning lens (fθ lens) used by a laser printer and the like, having an optically functional face FA. Hereunder, the optical component 10 may be called a scanning lens, or sometimes, simply a lens. An optical axis of the lens is set as Z axis. A longitudinal axis, sometimes called a mother line, is set as X axis. A latitudinal axis, sometimes called a daughter line, is set as Y axis. As an example of the embodiment, the lens 10 is to be molded, in which the mother line is set at 140 mm and the daughter line is set at 8 mm, and the maximum dimension in the optical axis is set at 30 mm. Further, the center point of the optically functional area FA is set at the origin of the X-Y coordinate system, as shown in FIG. 1B. As a molding material of the lens 10, an amorphous polyolefin resin is used, for example.

Figure 2A:
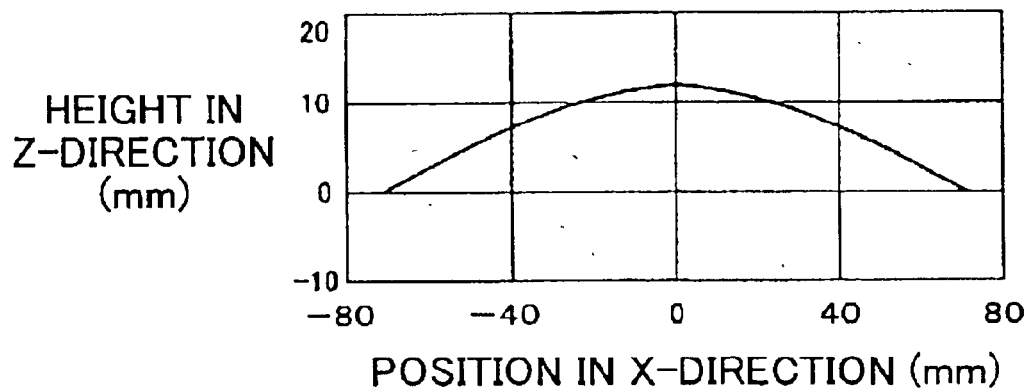
FIG. 2A is a graph for explaining a shape of the optical component (lens) that is molded according to the embodiment of the present invention showing height in the Z-direction (main scanning direction)
Figure 2B:
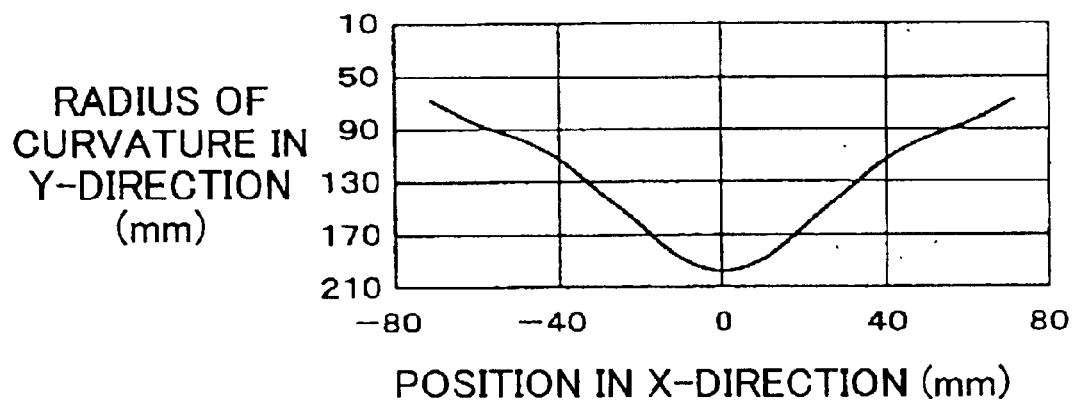
FIG. 2B is a graph for explaining a curvature of the optical component in the Y-direction (sub-scanning direction)

In this embodiment, shape of the lens in the mother line direction (sometimes called main scanning direction) is given by height in the Z-direction as shown in FIG. 2A, and the daughter line direction (sometimes called sub-scanning direction) is given by radius of curvature in the Y-direction (YZ cross section) as shown in FIG. 2B.

The optically functional area FA of the lens 10 has an aspheric surface. Generally, an aspheric surface is known to be expressed by a formula (1), where z represents a depth in the direction of Z, x represents a height in the X-direction (lens height in the mother line direction), and y represents a height in the Y-direction (lens height in the daughter line direction).

$$z = c1 \cdot x^2 / \left[1 + \{1 - (1 + k1)(c1 \cdot x)^2\}^{0.5}\right] + \\ c2 \cdot y^2 / \left[1 + \{1 - (1 + k2)(c2 \cdot y)^2\}^{0.5}\right] + \sum_{m=1}^{M}\sum_{n=1}^{N} A_{mn} \cdot x^m \cdot y^n \quad (1)$$

Here, c1 represents a curvature in the mother line direction nearby the optical axis, c2 represents a curvature in the direction of the daughter line nearby the optical axis, k1 represents a cone constant in the mother line direction, and k2 represents a cone constant in the daughter line direction. Values of c2 and k2 are dependent on the height in the mother line direction. The third term of the formula (1) is a polynomial, where m and n are degrees of x and y, respectively, M and N are maximum degrees of x and y, respectively, and $A_{mn}$ is a constant of the polynomial.

Figure 3A:
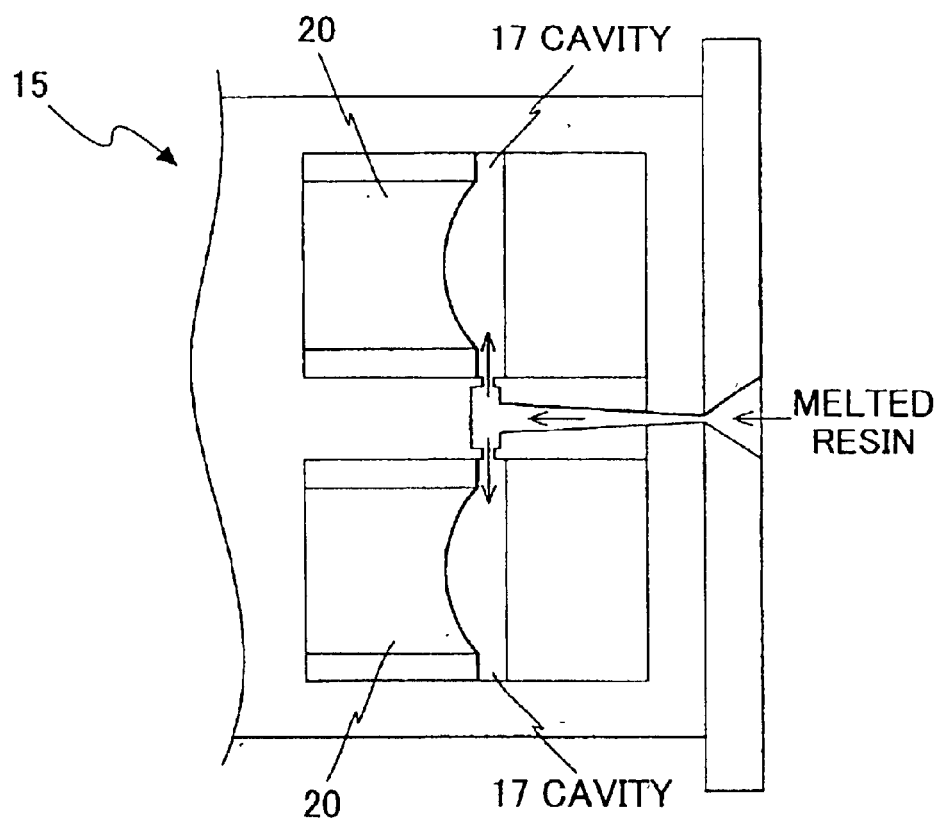
FIG. 3A is a plan view of an injection mold for molding the lens.
Figure 3B:
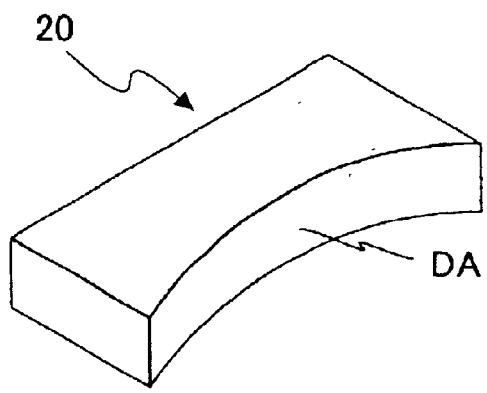
FIG. 3B is a perspective view of a molding pat shown in FIG. 3A.

FIGS. 3A and 3B show parts of an injection mold 15 that is used for molding the lens 10. The injection mold 15 includes a plurality of molding parts. A predetermined shape of a cavity 17 is formed by the moldings part shown in FIG. 3A. In FIG. 3B, a molding part 20 is shown, which forms the optically functional area FA of the lens 10, and is one of the plurality of the molding parts. The molding part 20 has a surface DA that is in a shape (surface shape) approximately the same as the optically functional area FA of the lens 10. From a pouring gate of the injection mold 15, melted and pressurized resin is filled in the cavity 17, via a runner and a gate (floodgate).

When the resin solidifies, the shape of the surface DA of the molding part 20 is copied to the resin. Therefore, precision of the surface DA of the molding part 20 greatly affects precision of the shape of the lens 10.

Then, in the following, the production method of the molding part 20 is described in reference to a flowchart of FIG. 4. Here, the designed shape of the optically functional area FA of the lens 10 is considered to be expressed by the formula (1). Further, the depth z is defined as a function of the lens height in the mother line direction x, and the lens height in the daughter line direction y, as expressed by a formula (2) that follows.

$$z = f(x, y) \quad (2)$$

In the present embodiment, for example, a first molding part is produced, based on the object shape of the lens 10, and then, the first molding part is reworked, based on shape errors contained in the lens 10 that is produced using the first molding part, such that the first molding part as reworked is made a second molding part, that is, the molding part 20.

Figure 4:
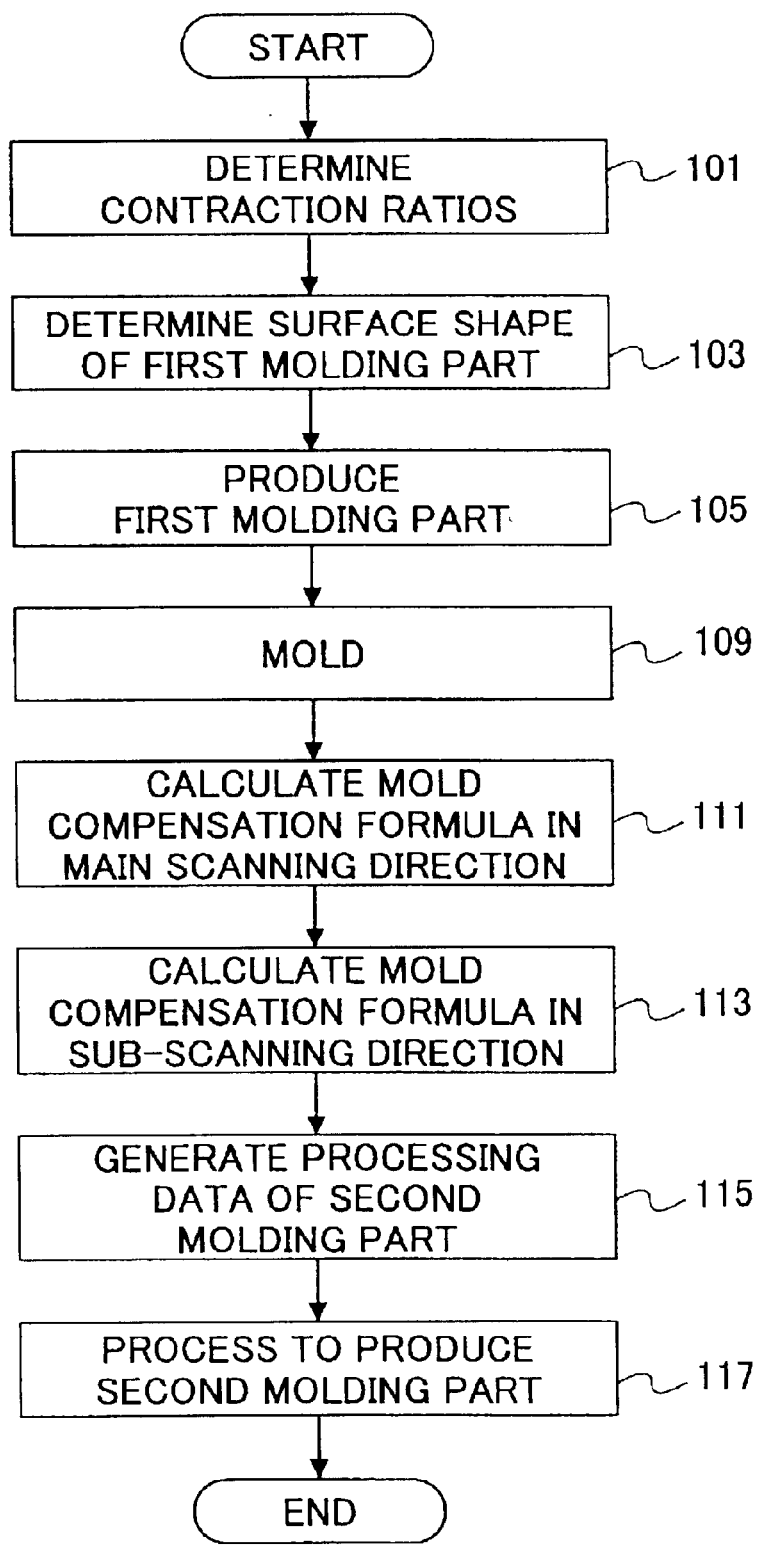
FIG. 4 is a flowchart explaining a first embodiment of a production method of an injection mold of the present invention.

At step 101 of FIG. 4, contraction ratios of the resin that is the material of the lens 10, $m_x$, $m_y$, and $m_z$ in the X, Y and Z-directions, respectively, are determined. The present embodiment uses amorphous polyolefin resin as the molding material, and employs $m_x = 0.99325$, $m_y = 0.99215$, $m_z = 0.99206$ for the amorphous polyolefin resin from experiences.

Next, at step 103, the surface shape of the cavity of the first molding part (hereinafter called surface shape of the first molding part) is determined. Here, the surface shape of the first molding part is defined by a formula (3) that considers the contraction ratios, as the designed shape of the lens 10.

$$z = -f(-0.99325x, 0.99215y)/0.99206 \quad (3)$$

Figure 5A:
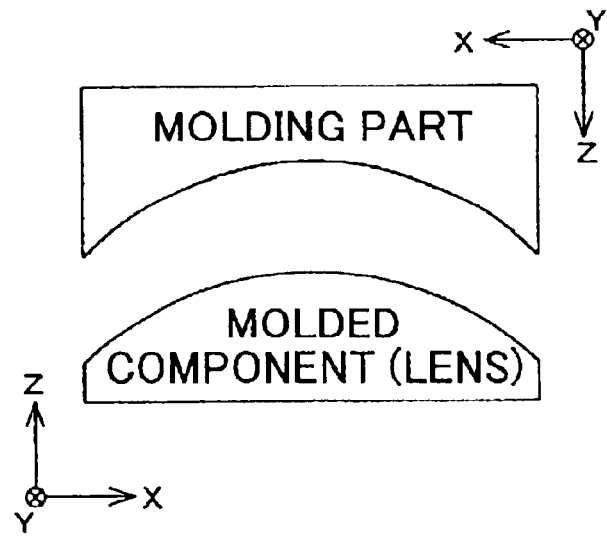
FIGS. 5A and 5B are illustrations for explaining coordinate relationships of the molding part and a molded component.

In the present embodiment, the lens 10 and the first molding part have the same incrementing direction in the Y axis, while having opposite incrementing directions in the X and Z axes as shown in FIG. 5A.

Figure 5B:
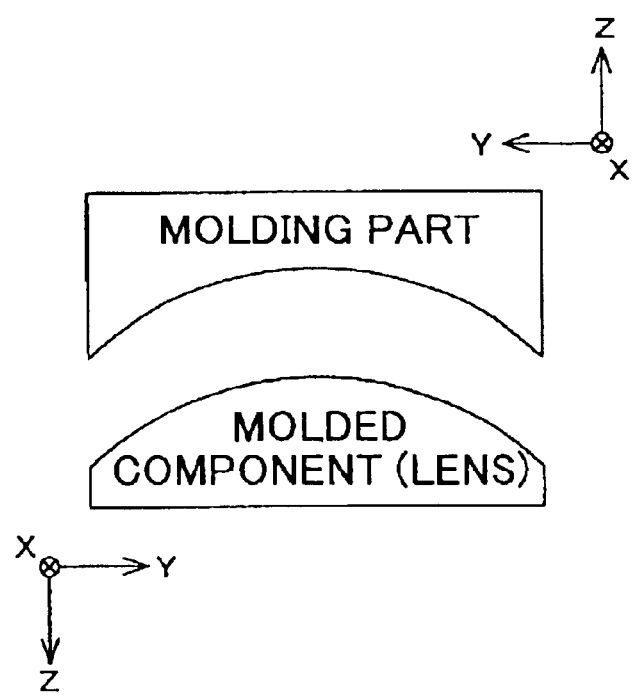

If, however, the lens 10 and the first molding part have the same incremental direction in the X axis, and have opposite directions in the Y and Z axes as shown in FIG. 5B, the surface shape of the first molding part is expressed by a formula (4), instead of the formula (3).

$$z = -f(0.99325x, -0.99215y)/0.99206 \quad (4)$$

Because the difference between the formula (3) and the formula (4) is that the signs of the constants of x and y are opposite, the explanation will be made in the case that the Y axis is in the same incremental direction. (In the case that the X axis is in the same incremental direction, following step can be applied with replacing the positive and negative signs of the constants of each of x and y.)

Figure 6:
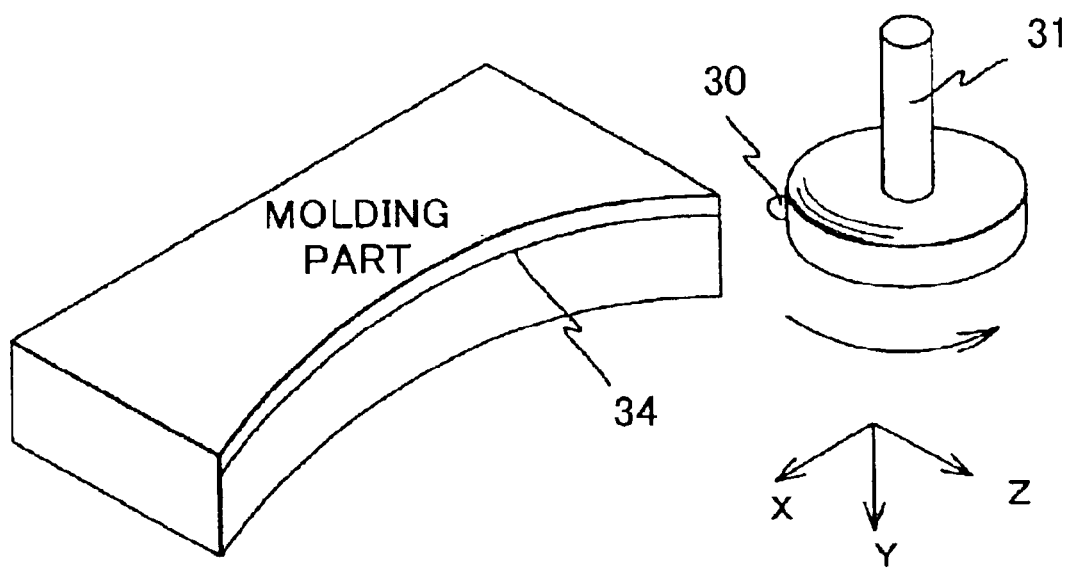
FIG. 6 is for explaining a cutting process of the molding part.

In reference to FIG. 4, the first molding part is produced based on the surface shape at step 105. An automated machine tool by numerical control, such as an NC lathe (sometimes called a mold processing machine, or simply an NC machine), is used in producing the first molding part in order to acquire a high processing precision. The surface shape of the first molding part is converted to data for numerical control (NC data, etc.), and input to the mold processing machine. For example, the mold processing machine includes a single crystal diamond tool 30 and a tool spindle 31 as shown in FIG. 6. The tool spindle rotates at a given speed around the Y axis. The single crystal diamond tool 30 is provided on the peripheral surface of the tool spindle 31. Further, the first molding part can move in three axial directions of X, Y and Z by a movable stage that is not shown. When a raw material of the first molding part (for example, Ni-plated stainless steel) is set at a predetermined position of the mold processing machine, the tool spindle 31 starts rotating by an instruction from a control apparatus not shown. Accordingly, the diamond tool 30 starts cutting work along a first processing line 34 by a simultaneous two-axis control of X and Y axes. When the cutting work of the process line 34 is finished, then, the first molding part is shifted in the Y axis by a predetermined pitch, such that a next process line is worked. Repeating this operation, the first molding part that has designed surface shape is produced. The cutting tool does not have to be a single crystal diamond tool, but other tools can be chosen according to materials, required precision and the like.

At step 109 shown in FIG. 4, injection molding is performed under predetermined conditions, using the injection mold to which the first molding part is set. In the present embodiment, an electric injection molding machine, for example, was used with other miscellaneous components prepared, and as the predetermined conditions, the mold temperature was set at 135 degrees C., the resin temperature was set at 280 degrees C., the injection speed was set at 20 m/second, the injection pressure was set at 50 MPa, and the cooling period was set at 300 seconds. These values are examples. The injection mold of the present embodiment is capable of producing two lenses at a process, as shown by the mark (A) of FIG. 3. However, the number of the lenses that can be simultaneously molded is not limited to two.

Next, at step 111, a molding part compensation formula is calculated such that the shape errors in the main scanning direction (the first direction) of the lens 10 that is molded are compensated. A process of the calculation is explained using a flowchart of FIG. 7. In the present embodiment, the calculation of the molding part compensation formula for compensating the shape errors in the main scanning direction is based on the shape of the optically functional FA of the lens 10 (hereinafter called the lens shape).

Figure 7:
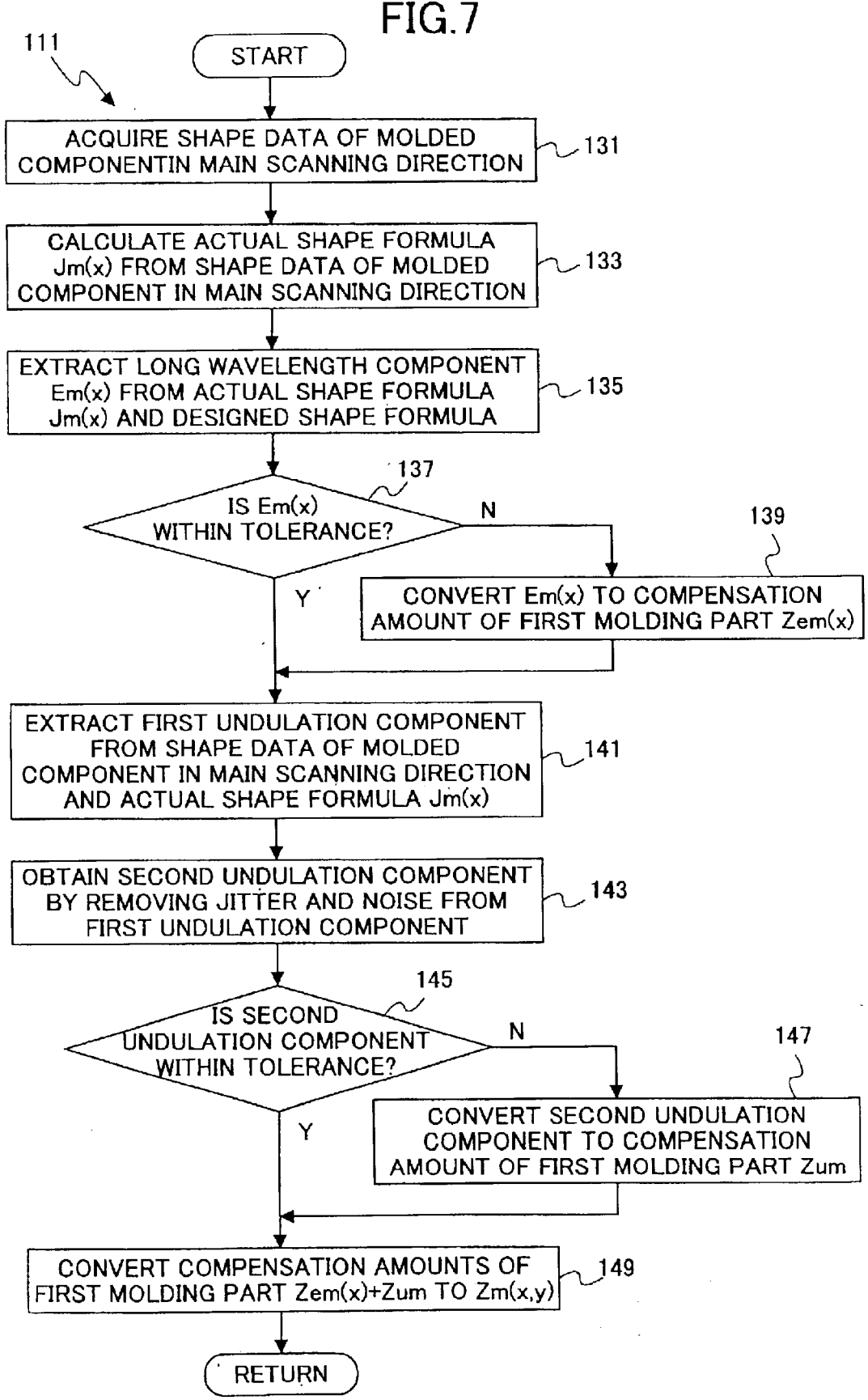
FIG. 7 is a flowchart explaining details of step 111 of FIG. 4 (calculation process of molding part compensation formula in the main scanning direction)
Figure 8A:
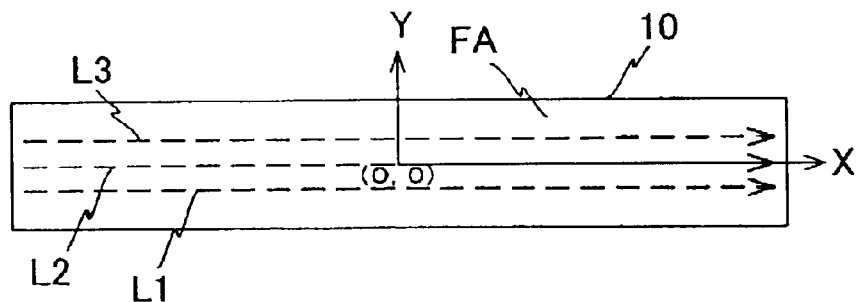
FIGS. 8A, 8B and 8C are illustrations for explaining shape data measuring points in the main scanning direction.
Figure 8B:
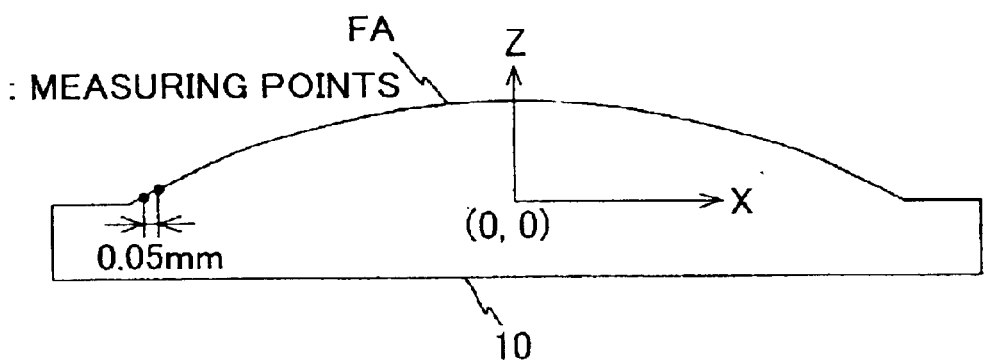
Figure 8C:
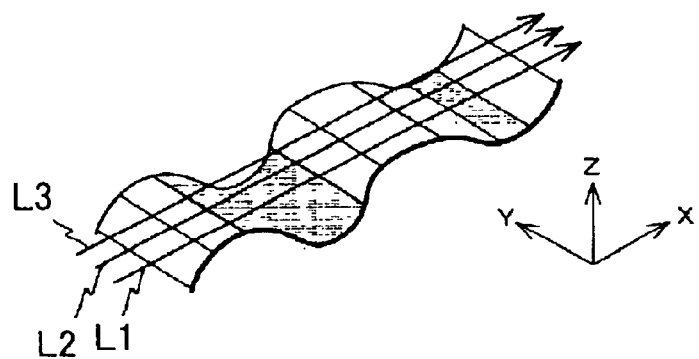

At step 131 of FIG. 7, shape data of the lens shape in the main scanning direction is acquired by a super-high precision three-dimensional measuring instrument that is now shown. As shown in FIG. 8A, three scanning lines L1, L2, and L3 are setup in the direction of X. For example, the scanning line L2 is set on the X axis, a space in the Y-direction between the scanning line L2 and L1 is set at 1 mm, and a space in the Y-direction between the scanning line L2 and L3 is set at 1 mm. Each of the scanning lines is scanned by a probe (not shown) of the super-high precision three-dimensional measuring instrument, such that height (depth) values in the Z-direction are measured at a predetermined pitch. In the present embodiment, the pitch is set at 0.05 mm in the X-direction as shown in FIG. 8B.

Then, the measurement values of the three scanning lines are averaged, and the averaged value is made actual measurement data in the main scanning direction. This is because it is known that error components that do not vary in the Y-direction largely influence the condensing property of the lens 10.

Figure 9A:
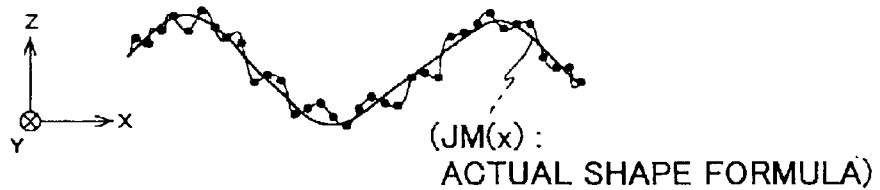
FIGS. 9A, 9B, 9C and 9D are illustrations for explaining shape errors in the main scanning direction.

At step 133, the actual measurement data in the main scanning direction, as shown in FIG. 9A, is applied to a polynomial, such that an approximation formula (an actual shape formula) Jm(x) is obtained. For example, a least squares method may be used. The degree of the polynomial used here is desired to be low in view of suppressing influences of noise. However, if the degree is too low, the actual measurement data in the main scanning direction tends to deviate from the center, causing an inconvenience in low-pass filtering at a later stage. By a knowledge acquired after various studies, it is determined that it is adequate to set the degree at near the degree of the designed molding formula as given by the formula (1) above. Accordingly, in the present embodiment, the degree is set at 4, for example. The actual shape formula Jm(x) obtained in this manner represents long wavelength components contained in the actual measurement data in the main scanning direction, as shown in FIG. 9A. In FIG. 9A, actually measurement values, shown by dots, are also connected for convenience.

At step 135 of FIG. 7, a difference Em(x) between a design shape formula Dm(x) and the actual shape formula Jm(x) is obtained using a formula (5) that follows. Namely, Em(x) represents the long wavelength components (the first wavelength component) of the shape errors in the main scanning direction.

$$Em(x)=Jm(x)-Dm(x) \qquad (5)$$

Here, Dm(x) is given by the formula (1), with y being set at 0 (y=0).

Figure 9B:
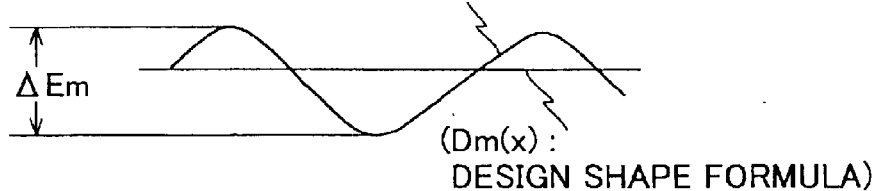

At step 137, as shown in FIG. 9B, a difference ΔEm (hereinafter PV value) between the maximum (peak) value and the minimum (valley) value of the long wavelength component Em(x) of the shape error is compared with a predetermined tolerance. If the PV value exceeds the predetermined tolerance, a compensation of Em(x) is necessary, and a result of checking at step 137 is "No". The process proceeds to step 139. For convenience, the design shape formula Dm(x) is represented by a straight line in FIG. 9B.

At step 139 in FIG. 7, a formula (6) is used such that a compensation amount Zem(x) of the first molding part is obtained by converting the long wavelength component Em(x) of the shape error.

$$Zem(x)=-Em(m_x\,x)/m_z \qquad (6)$$

Here, $m_x$ represents the rate of contraction of the resin in the X-direction, and $m_z$ represents the rate of contraction of the resin in the Z-direction. When the conversion to the compensation amount Zem(x) is finished, the process proceeds to step 141.

If, at step 137, it is determined that ΔEm is within the predetermined tolerance, the compensation of the long wavelength components Em(x) is unnecessary, that is a checking result of step 137 is affirmative Y. Then, the process proceeds to step 141, and, in this case, 0 is set to Zem(x) Next, at step 141, a first undulation component contained in the actual measurement data in the main scanning direction is extracted from a difference between the actual measurement data in the main scanning direction and the actual shape formula Jm(x). The first undulation component contains a component in wavelength shooter than 1 mm, so-called jitter component, which does not remarkably affect the optical properties of the lens 10.

Figure 9C:
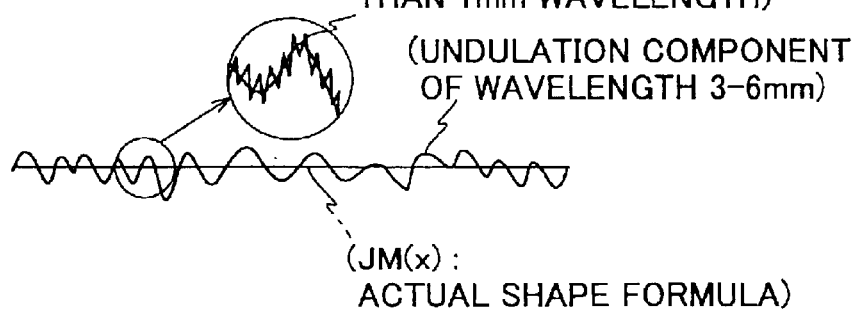

Then, at step 143, a second undulation component (the second wavelength component) that contains wavelength components in a wavelength range between 3 mm and 9 mm is extracted by removing the jitter component and the noise contained in the first undulation component using a bandpass filter, as shown in FIG. 9C. Here, although the actual measurement data consists of discrete values, the actual shape formula Jm (x) is expressed by a straight line for convenience, and the actual measurement data in the main scanning direction is expressed by a curve.

At step 145 of FIG. 7, it is checked whether the PV value of the second undulation component is within a predetermined tolerance. If it is determined that the PV value of the second undulation component exceeds the predetermined tolerance, a compensation of the second undulation component is required, and the process proceeds to step 147.

Figure 9D:
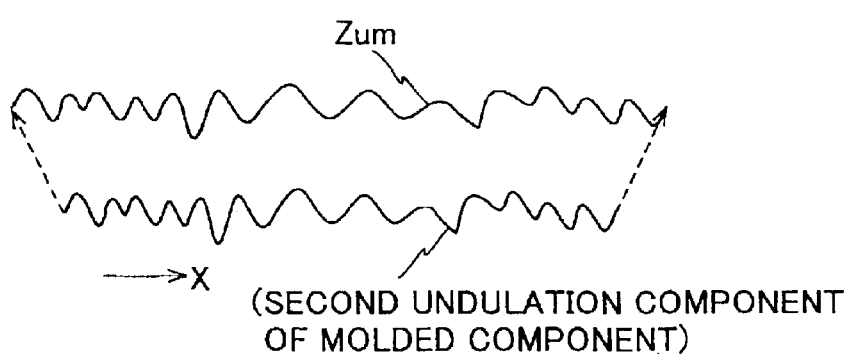

At step 147, the second undulation component is converted to a compensation amount Zum of the first molding part. Here, in order to align the wave shape of the second undulation component with the first molding part, the contraction ratio in the X-direction mis used such that the second undulation component is expanded in the main scanning direction, as shown in FIG. 9D. In the drawing, the second undulation components and the compensation amount Zum of the first molding part are expressed by curves, for convenience, although they are discrete data. When the conversion to the compensation amount Zum of the first molding part is finished, the process proceeds to step 149.

At step 145, if the PV value of the second undulation component is determined to be within the predetermined tolerance, no compensation is necessary. That is, an affirmative result Y is provided, and the process proceeds to step 149. In this case, zero is set to the compensation amount Zum of the first molding part.

At step 149, the compensation amount of the first molding part Zem(x) due to the long wavelength component Em(x) and the compensation amount of the first molding part due to the second undulation component Zum are added, such that a compensation formula Zm(x) is obtained.

Since the value of the compensation formula of the first molding part Zm(x) does not vary in the Y-direction, as previously described (refer to FIG. 8C), Zm(x) can be made a compensation formula of the first molding part in the XY plane Zm(x,y). With this step, step 111 of FIG. 4 is finished, and the process proceeds to step 113 of FIG. 4.

At step 113 of FIG. 4, a molding part compensation formula is calculated, which is to compensate the shape errors in the sub-scanning direction (the second direction) of the lens 10 that is molded. Details of the process are explained using a flowchart of FIG. 10. In the present embodiment, the molding part compensation formula is used such that the shape errors in the sub-scanning direction are compensated based on the lens shape.

Figure 10:
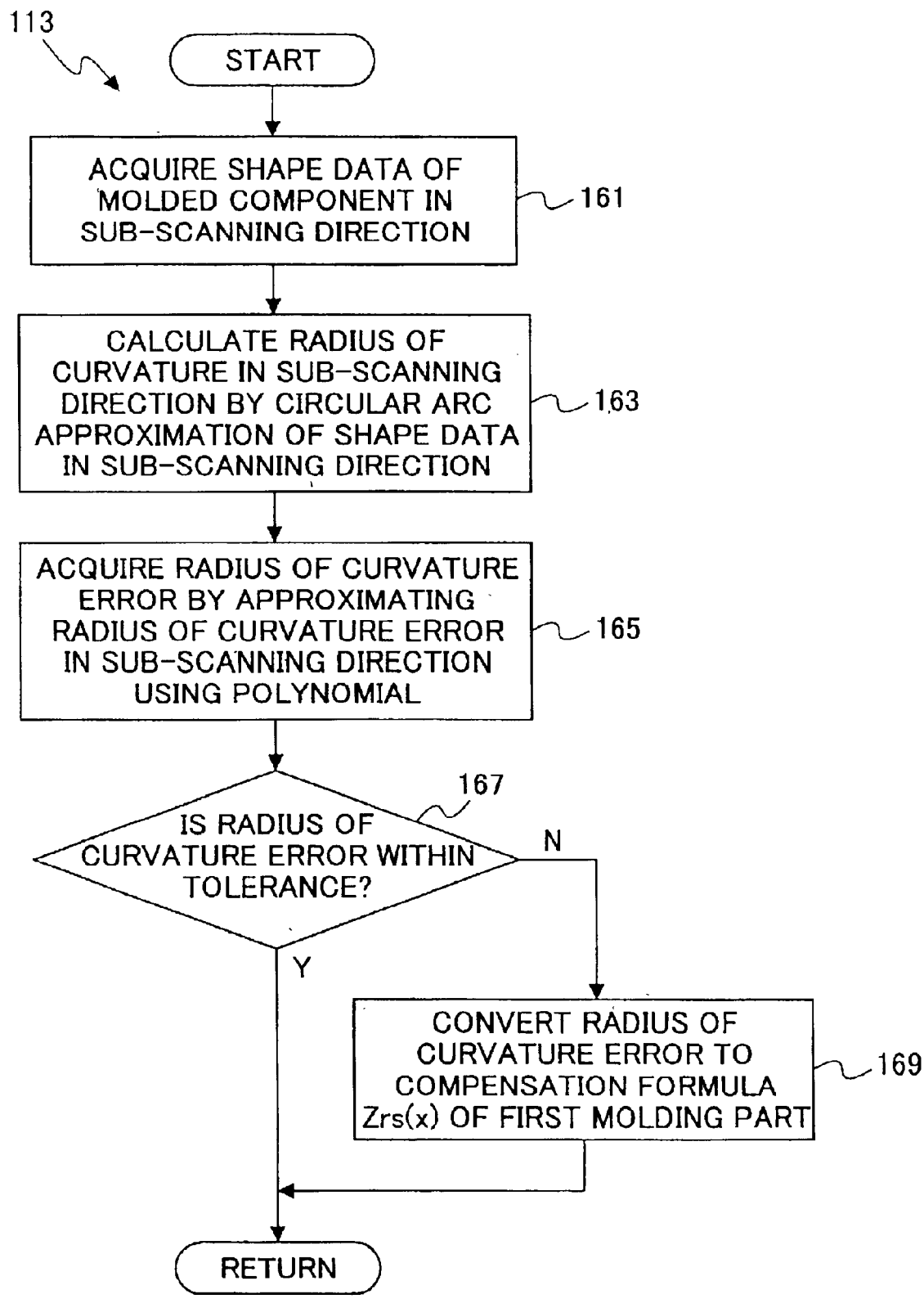
FIG. 10 is a flowchart for explaining details of step 113 of FIG. 4 (calculation process of molding part compensation formula in the sub-scanning direction)
Figure 11A:
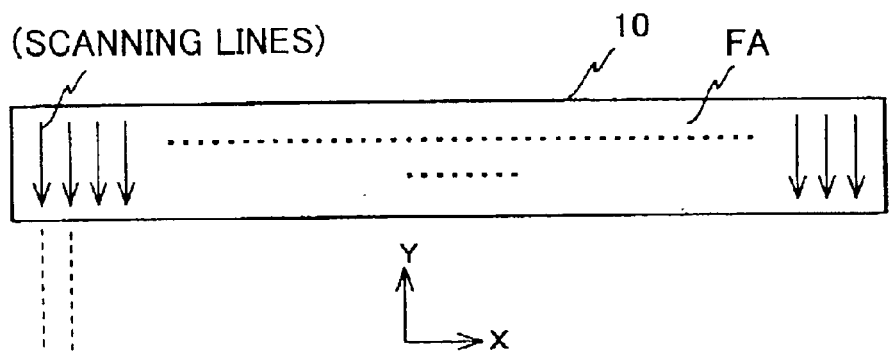
FIGS. 11A, 11B and 11C are illustrations for explaining shape data measuring points in the sub-scanning direction.
Figure 11B:
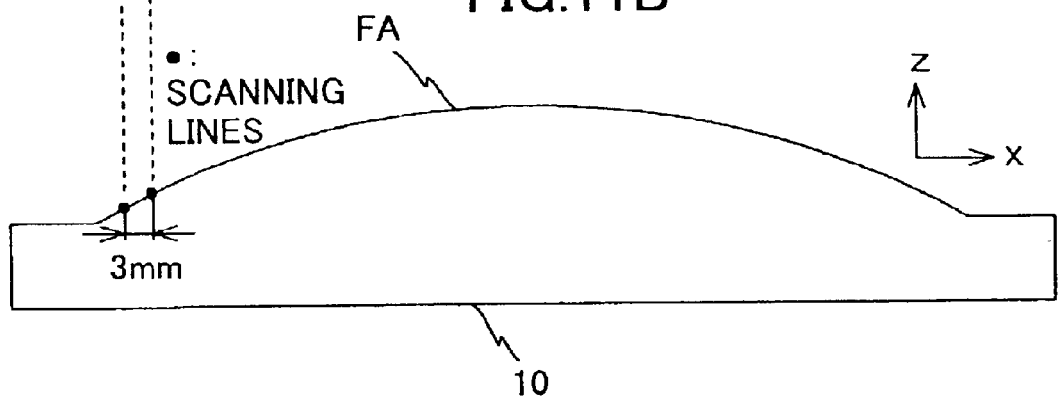
Figure 11C:
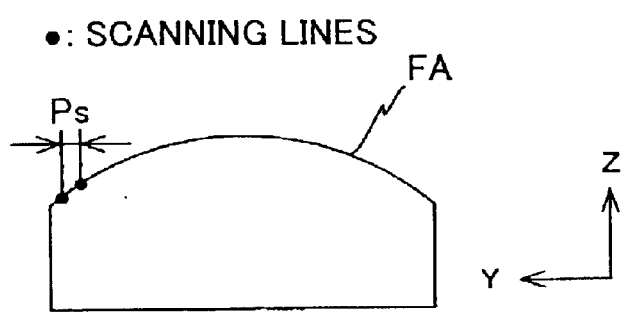

At step 161 of FIG. 10, the shape data in the sub-scanning direction is acquired by measuring the lens shape by the super-high precision three-dimensional measuring instrument (not shown). As shown in FIG. 11A, a plurality of scanning lines are set in the negative direction of Y (−Y-direction). For example, an interval between the scanning lines is set at 3 mm in this embodiment, as shown in FIG. 11B. Scanning is performed over each of the scanning lines by a measurement probe (not shown) of the high precision three-dimensional measuring instrument, such that height (depth) in the Z-axis direction is measured at a predetermined pitch Ps. In the present embodiment, the pitch Ps is set at a few mm in the Y-direction. Each of measurement values is compensated in view of inclination with reference to the actual measurement data in the main scanning line, which is acquired in the shape measurement in the main scanning direction, before the measurement values are made the actual measurement data in the sub-scanning direction. In the case that the first molding part is removed from the high-precision three-dimensional measuring instrument after the shape measurement in the main scanning direction, the actual measurement data in the main scanning direction cannot be used as a reference, and the shape data in the main scanning direction (for example, the scanning line L2) is measured again.

Figure 12A:
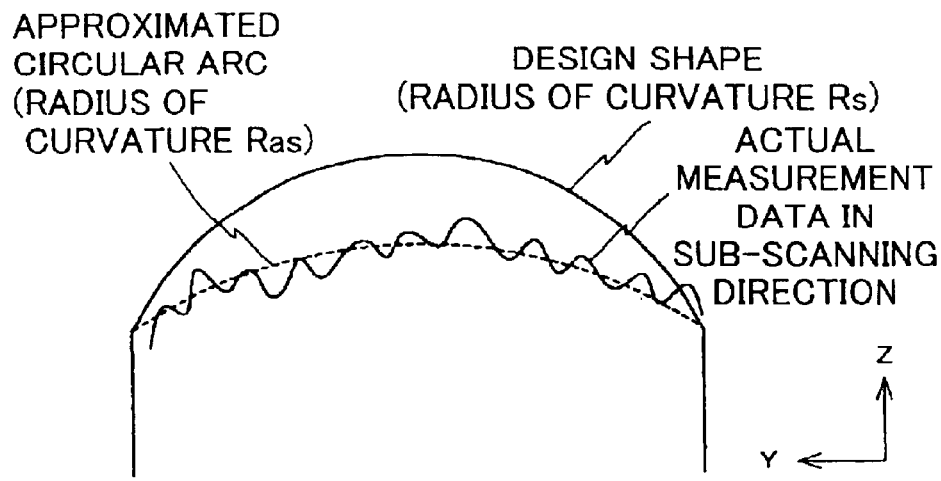
FIG. 12A is an illustration for explaining measured data in the sub-scanning direction.

At step 163 of FIG. 10, values of the actual measurement data in the sub-scanning direction for every scanning line are approximated to a circular arc, as shown in FIG. 12A. Radius of curvature Ras is computed, using, for example, the least squares method. Here, although the values of the actual measurement data are discrete, the values are represented by a curve for convenience.

Figure 12B:
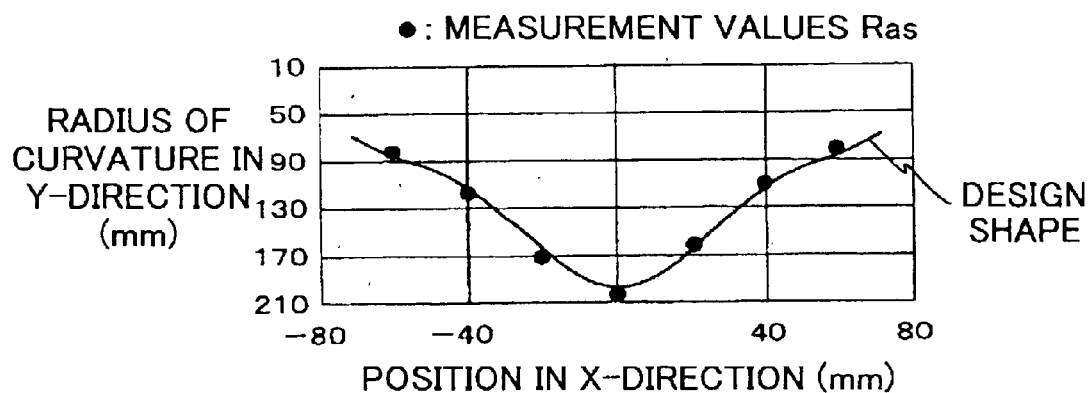
FIG. 12B is a graph showing a radius of curvature.
Figure 12C:
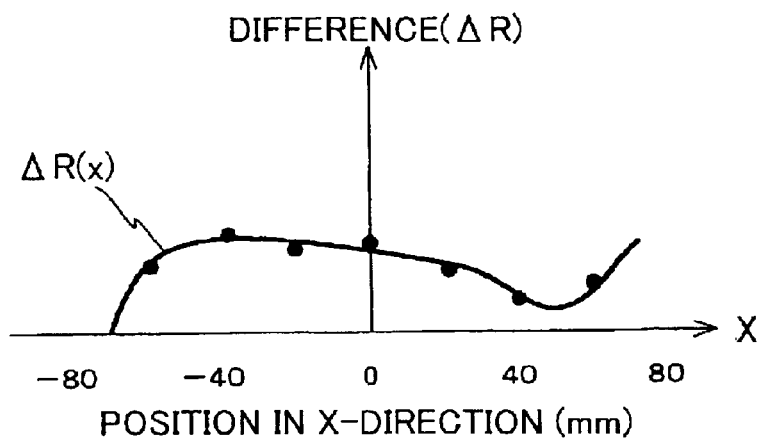
FIG. 12C is a graph showing error in the radius of curvature.

At step 165 of FIG. 10, an error of the radius of curvature $\Delta R$ (the third wavelength component) is obtained, which is a difference between the radius of curvature Ras calculated for each scanning line, and the designed value obtained from the design shape, as shown in FIG. 12B. Further, each value of the radius of curvature error $\Delta R$ is approximated to a polynomial as a function of a position in the X-direction, such that a radius of curvature error formula $\Delta R(x)$ is obtained, as shown in FIG. 12C. In this manner, a $\Delta R$ value can be interpolated at any X position. A 4-degree to 16-degree polynomial may be used for this purpose. In this embodiment, a 4-degree polynomial is used. For convenience purposes, only a part of data is presented in FIGS. 12B and 12C.

At step 167 of FIG. 10, it is checked whether the maximum value of the radius of curvature error calculated by the radius of curvature error formula $\Delta R(x)$ is within a predetermined tolerance. If the maximum value above exceeds the predetermined tolerance, compensation is required. The check result at step 167 is negative N, and the process proceeds to step 169. Here, the maximum value of the radius of curvature error is used as an example, however, an integrated value of the error, and a value of the error at a predetermined specific position may be used.

At step 169, the radius of curvature error formula $\Delta R(x)$ is converted to a compensation formula of the first molding part Zrs(x), using a formula (7).

$$Zrs(x) = -\Delta R(-m_x x)/m_r \quad (7)$$

Here, $m_r$ represents a contraction ratio at the molding process of the resin in the YZ cross-section, which is obtained in advance by molding a spherical or cylindrical test object. Different values may be used for the Y-direction and the Z-direction. When the conversion to the compensation formula Zrs(x) is finished, the process of step 113 of FIG. 4 is completed.

If, at step 167, the maximum value of the radius of curvature error is determined to be within the tolerance, no compensations are necessary, and the checking result of step 167 is affirmative Y. Then, the process of step 113 of FIG. 4 is finished, with zero being set to the compensation formula Zrs(x) of the first molding part.

At step 115 of FIG. 4, processing data to produce the second molding part is generated from the compensation formula of the first molding part in the main scanning direction Zm(x,y), and the compensation formula of the first molding part in the sub-scanning direction Zrs(x). When; both the value of Zm(x,y) and the value of Zrs(x) are zero, no compensation processing of the first molding part is necessary, and processing data to produce the second molding part is not generated. Instead, the processing data that was used in producing the first molding part is used in producing the second molding part. Accordingly, the processing data of the second molding part is generated when at least one of the values of Zm(x,y) and Zrs(x) is not zero, which case will be further explained below.

Figure 13A:
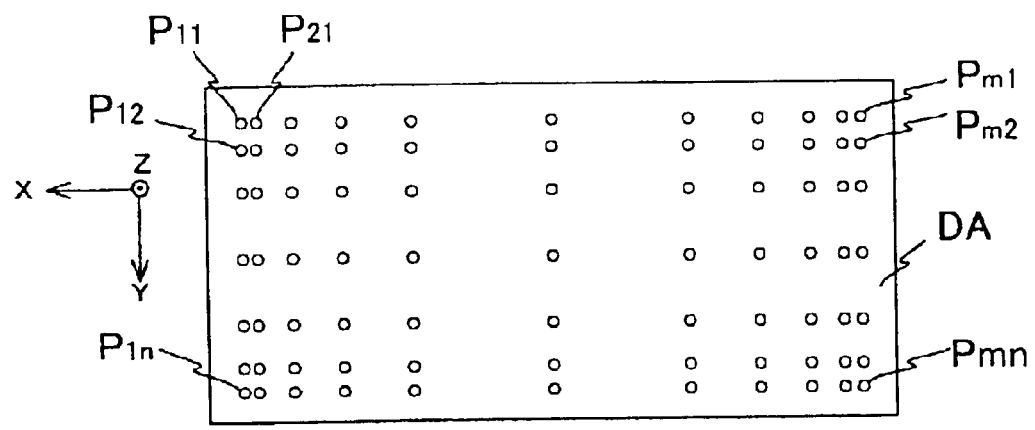
FIG. 13A is a plan view of the molding part for explaining data points.
Figure 13B:
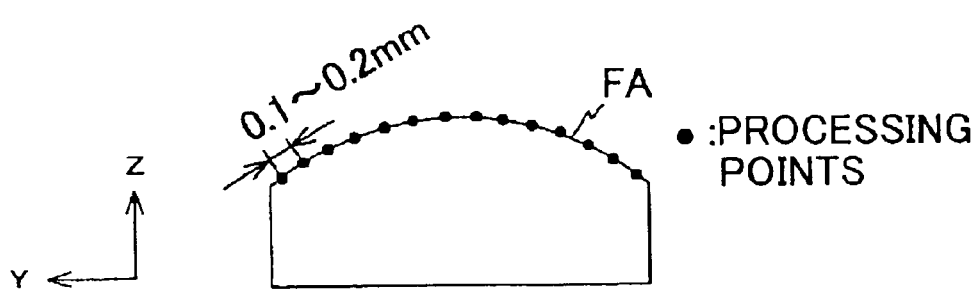
FIG. 13B is a side view of the molding part for explaining data points.
Figures 13C, 13D:
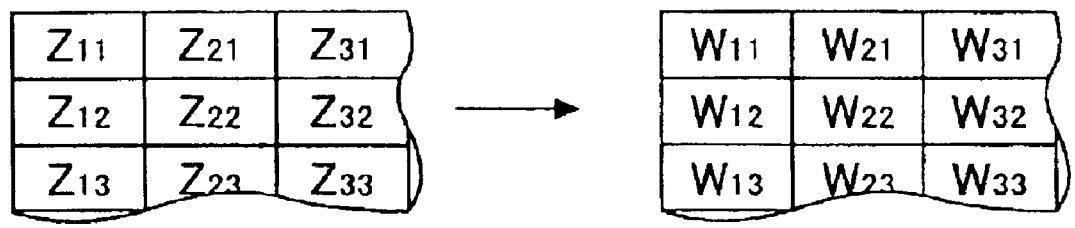
FIGS. 13C and 13D are illustrations for explaining processing data to be used at compensation process of the molding part.

First, the compensation amount of the first molding part is expressed by height data in the XY plane, that is, a so-called Zmap is generated. As shown in FIG. 13A, m x n pieces of processing points are set in a matrix shape on a process target surface, with the X-direction being provided with m processing points at an equal interval (e.g. 0.1 mm to 0.2 mm), and the Y-direction being provided with n processing point at an equal interval (e.g. 0.1 mm to 0.2 mm; refer to FIG. 13B). Each of the processing points is expressed as $P_{1j}$ (i=1 through m, and j=1 through m). A compensation amount in the Z-direction of each of the processing point $Z_{1j}$ (i=1 through n, and j=1 through m) is obtained from the compensation formula of the first molding part in the main scanning direction Zm(x,y), and the compensation formula of the first molding part in the sub-scanning direction Zrs(x). $Z_{1j}$ is the Zmap. When the compensation process of the first molding part is performed by cutting, $Z_{1j}$ represents the amount of cutting. Since the amount of the compensation is small in the present embodiment, a point-contacting polishing process is employed. Ordinarily, a polishing process is employed where the compensation amount is less than 3$\mu$m. Here, Zmap is converted to Wmap that indicates a time length of a polishing tool to stay at a processing point. The time length is expressed as $W_{1j}$ (i=1 through m, and j=1 through n). The conversion is performed using a conversion table or a conversion formula that is generated based on actual experiment data measured under the same conditions (in regard to metal mold material, polishing tool, rotation speed, polishing load, and so on). Generating the Wmap in this manner is based on knowledge that a polishing amount is a function of staying time length of the polishing tool. In the present embodiment, an NC processing machine is used in the polishing process. For this purpose, an NC computer program as processing data is generated from the Wmap. An example of an NC computer program as the processing data is shown in FIG. 13D, where, "X1.20Y0.00W0.061" means that the staying time length of the polishing tool at X=1.20 and Y=0.00 is 0.061 seconds.

Figure 14A:
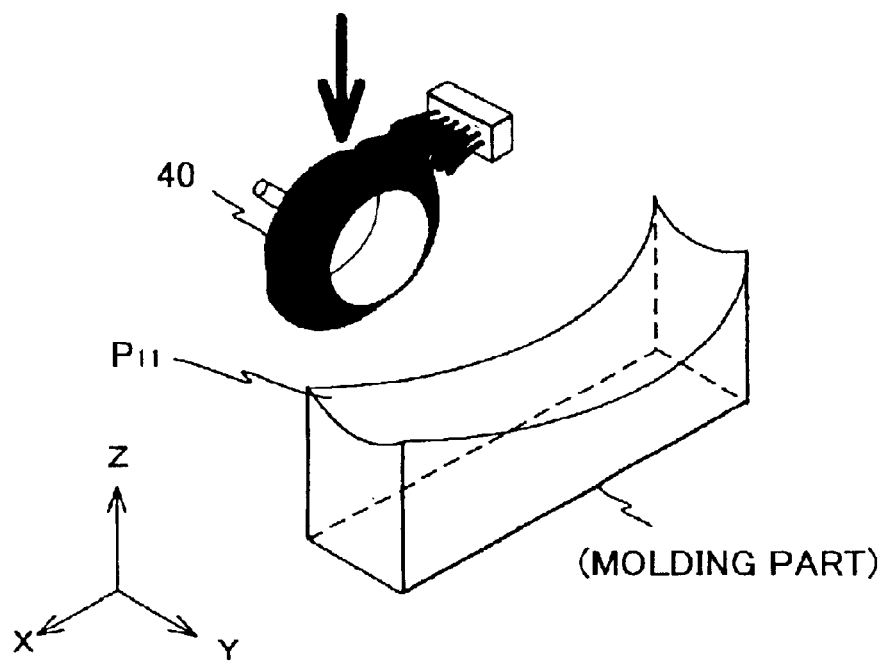
FIG. 14A is a perspective view of the molding part for explaining a polishing direction at the compensation process of the molding part.
Figure 14B:
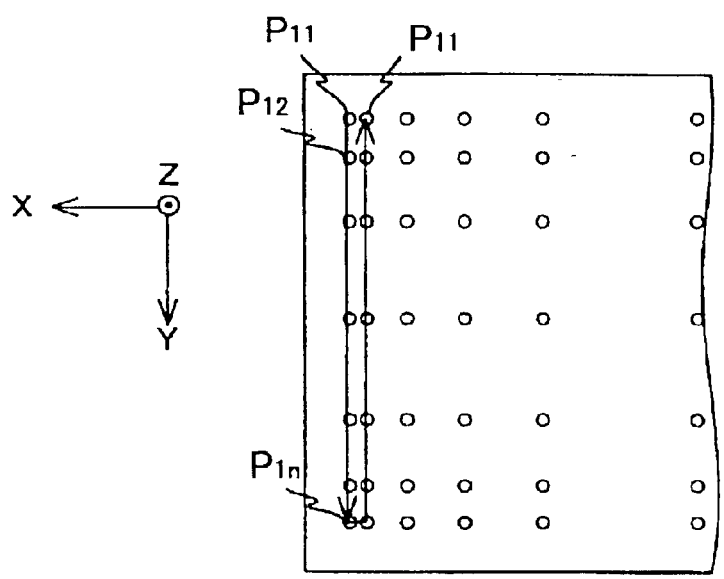
FIG. 14B is a plan view of a part of the molding part for explaining data points.

When the NC computer program is set to the NC processing machine, and the first molding part is placed at a predetermined position of the NC processing machine, the polishing tool 40 that is rotating, and is load with a polishing load in the Z-direction contacts a first processing point $P_{11}$, as shown in FIG. 14A for a time period specified by $W_{11}$. After a time elapse of $W_{11}$, one of the polishing tool 40 and the first molding part moves such that the contact position is set at $P_{12}$, where the polishing tool 40 stays for a period specified by $W_{12}$. In this manner, all processing points are processed with varied staying periods, based on the NC computer program. Here, the polishing tool 40 is, for example, a disk-shaped tool of compressed mixture of urethane resin and filler, with diamond paste as grinding granule. Further, it is desirable that a length of a contacting point for processing is shorter than a half of a wavelength of an undulation that should be removed. In this concern, the present embodiment adjusts size of the polishing tool 40 and the polishing load, such that the length of the contact area becomes 1 mm in diameter.

Figure 15A:
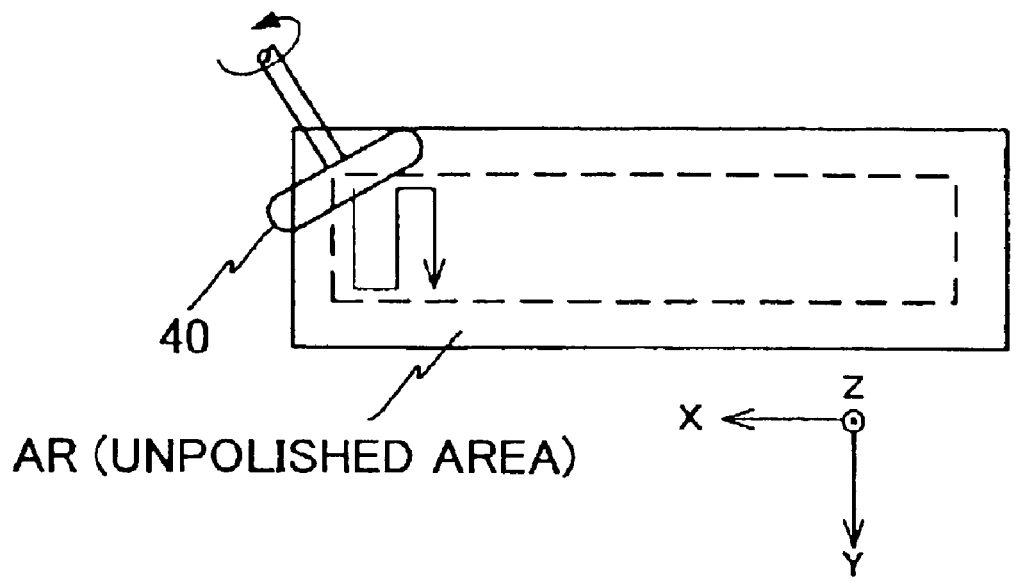
FIGS. 15A and 15B are illustrations for explaining a processing mark that is formed on a processed surface.
Figure 15B:
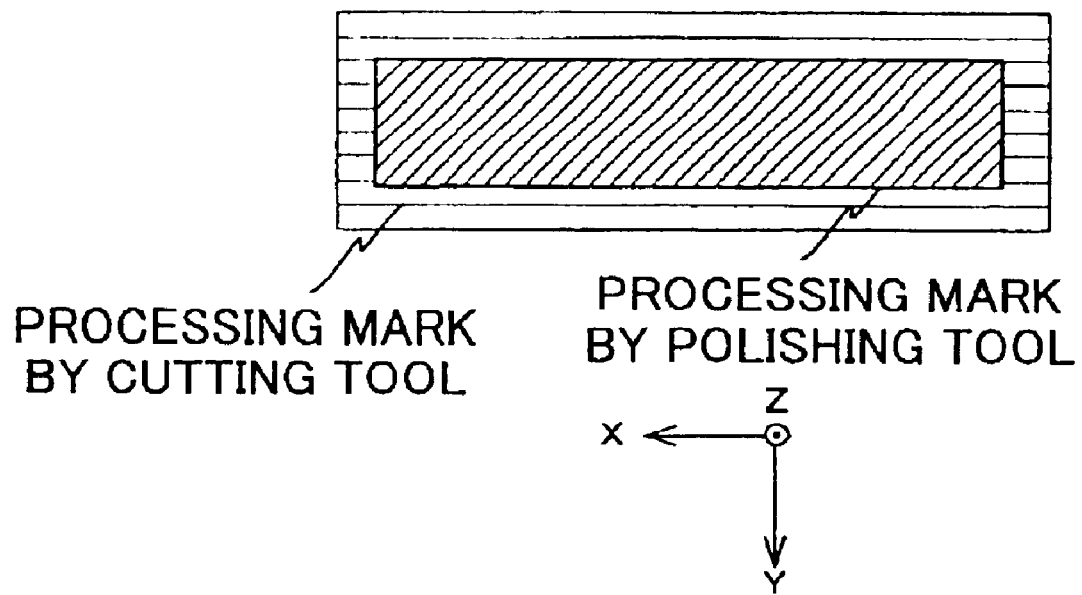

The first molding part that is processed as above and further processed through a predetermined finishing process becomes the second molding part. In the case of a cutting process, the process can be applied to the whole surface of the surface to be processed. However, in the polishing process, there is a margin at peripheral left unprocessed as indicated by AR in FIG. 15A, because the polishing tool may fall off the edges of the surface to be processed. If the first molding part is produced by the cutting process, and compensated by the polishing process, there are two processing marks as shown in FIG. 15B, unless a special jig is employed. Usually, a processing mark is present in a course direction of the cutting tool in the case of a diamond fly cutting, and a processing mark is present in a direction of rotation in the case of the point contacting polishing process. Accordingly, two sets of the processing marks are copied to the surface of the lens 10 molded by the second molding part that is produced as above.

As explained above, in the first embodiment, compensations are performed on three wavelength components, namely, the first wavelength component being a long wavelength component of the shape errors in the main scanning direction based of the shape data of the lens 10 in the main scanning direction, the second wavelength component being the undulation component in the wavelength range between 3 mm and 9 mm, and the third wavelength component being the radius of curvature errors in the sub-scanning direction based on the shape data of the lens 10 in the sub-scanning direction. The first molding part is processed to reduce the errors by compensating above errors such that the amounts of the errors are suppressed below respective predetermined tolerance amounts. The first molding part that is processed in this manner, which is made the second molding part, can produce the lens 10 that has reduced shape errors in a selected wavelength region that adversely affects the designed optical properties. As the result, an efficient production of the injection mold that can mold the lens 10 with the designed optical properties is realized.

In the first embodiment, an approximation using a polynomial is used. However, other methods are applicable, such as a direct interpolation to discrete data values, and an approximation to other functions. The direct interpolation can be performed using, e.g., a bi-linear method and a bi-cubic method. The approximation to other functions may use a known function model, such as a polynomial and NURBS, and the discrete data values are approximated to the function by the least squares approximation.

Furthermore, if the second wavelength component (the undulation component) in the main scanning direction and the radius of curvature error in the sub-scanning direction are simultaneously compensated, a wavelength LM in the X-direction of the radius of curvature error in the sub-scanning direction is better to be set longer than twice as long as the wavelength of the second wavelength component (the undulation component) in the main scanning direction. The wavelength LM is more or less dictated by the degree of the approximating polynomial, where the higher the degree is, the shorter the wavelength that can be compensated becomes. However, if the wavelength LM is set too short, there is a possibility of generating a new undulation in the main scanning direction at places other than the mother line. Therefore, the LM is set as described above. In this manner, the compensation process that efficiently enhances the optical properties of the lens 10 is realized, without needs for precise measurement data of the whole of the optically functional surface FA of the lens 10.

Hereafter, a second embodiment of the present invention is explained. The second embodiment differs from the first embodiment only in the process for calculating the molding part compensation formula in the main scanning direction (the first direction) (FIG. 7, and step 111 of FIG. 4). A molding part 20 is to be produced, which is to mold the lens 10 having the same shape as the first embodiment by the same material as used in the first embodiment. Explanations will follow based on a flowchart of FIG. 19, highlighting differences from the first embodiment in reference to the flowchart of FIG. 7.

In an example of the second embodiment, the first molding part is produced according to the shape targeted of the lens 10, the first molding part is processed based on the shape errors contained in the lens 10 and the shape of the first molding part, and the processed molding part is made the second molding part, i.e., the molding part 20. Accordingly, a premise here is that the first molding part has been produced, and the lens 10 have been molded in the same manner as the first embodiment.

Figure 16:
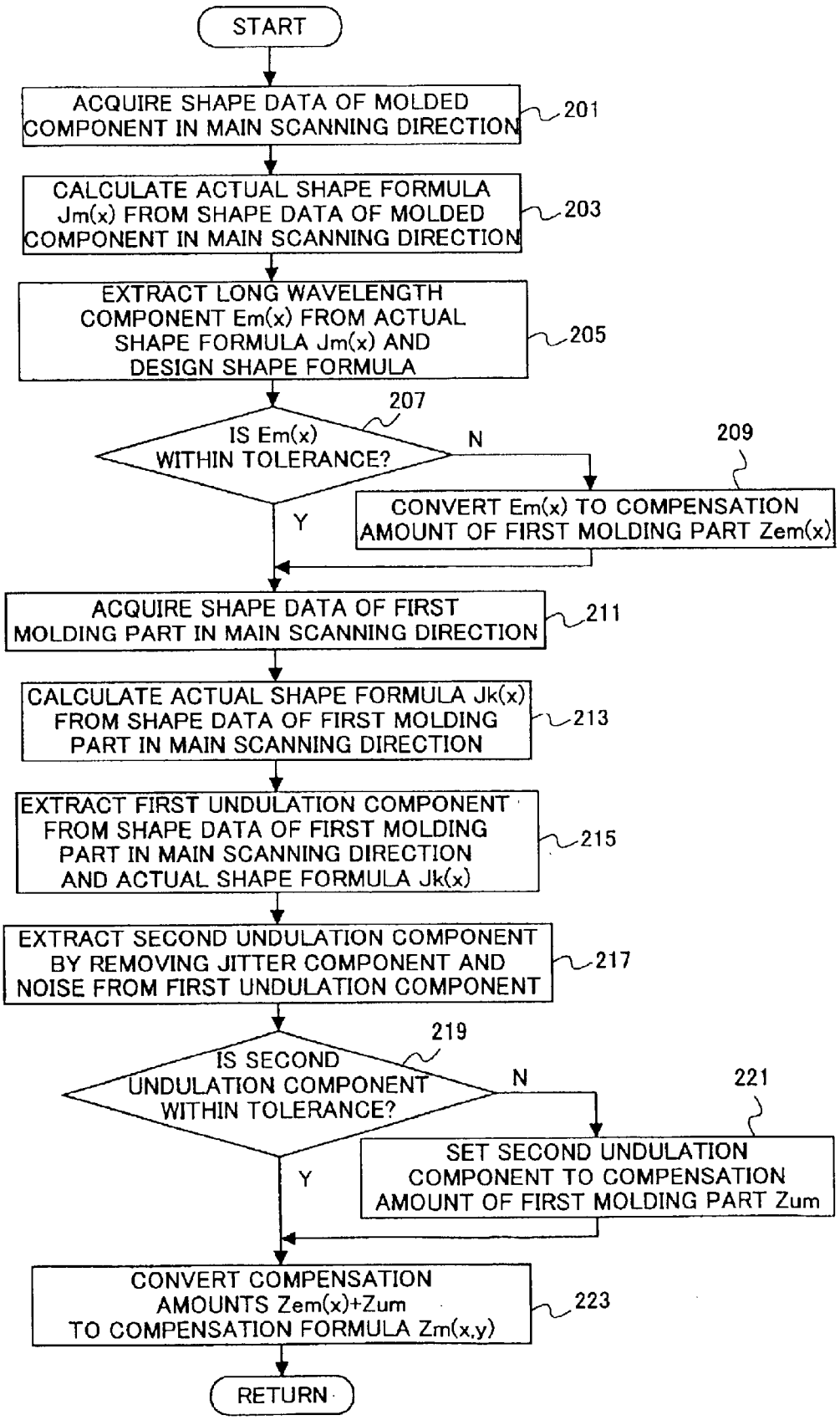
FIG. 16 is a flowchart explaining a calculation process of a compensation amount of the molding part in the main scanning direction in a second embodiment of the injection mold production method of the present invention.

Since step 201 through step 209 of FIG. 16 are the same as step 131 through step 138 of the first embodiment, explanation here will not be repeated. At step 211, the shape of the first molding part in the scanning direction is measured by a super-high-precision three-dimensional measuring apparatus (not shown), and measurement data is acquired. Here, the measurement is performed along three scanning lines, similar to the lens shape measurement, and an average value is made actual measurement data.

At step 213, the actual measurement data is applied to a polynomial, and an actual shape formula $Jk(x)$ is obtained, using, for example, a least squares method. Here, the degree of the polynomial is set at four, the same as the first embodiment. The actual shape formula $Jk(x)$ represents a long wavelength component contained in the actual measurement data.

At step 215, a first undulation component contained in the actual measurement data is extracted from the difference between the actual measurement data and the actual shape formula $Jk(x)$. In the first undulation component, a component of a wavelength shorter than 1 mm that does not affect the optical properties of the lens 10, so-called a jitter component, is included.

Then, the first undulation component is passed thorough a band-pass filter, such that the jitter component and noise contained in the first undulation component are removed at step 217. As the result, a second undulation component (the second wavelength component) that contains wavelength between 3 mm and 9 mm is extracted. On the side of the lens 10, the wavelength is shortened by the contraction ratio of the resin, however, a difference due to the contraction is about 1%, and does not affect the result of the extraction. Therefore, the first undulation component as it is applied to the band-pass filter that is the same as the first embodiment.

At step 219, it is checked whether a PV value of the second undulation component is within a predetermined tolerance. If the PV value of the second undulation component exceeds the predetermined tolerance, a compensation of the second undulation component is necessary, and the process proceeds to step 221 (N at step 219).

At step 221, the second undulation component is made a compensation amount Zum of the first molding part. Here, since the measurement data of the first molding part is used, a conversion process in consideration of the contraction ratio of the resin is not necessary, and the second undulation component, as it is, is made the compensation amount Zum of the first molding part. After the process of step 221, the process proceeds to step 223.

If, at step 219, the PV value of the second undulation component is determined to fall within the predetermined tolerance, the compensation of the second undulation component is not necessary (Y at step 219), and the process proceeds to step 223. In this case, zero is set to the compensation amount Zum of the first molding part.

At step 223, the compensation amount $Zem(x)$ of the first molding part due to the long wavelength component $Em(x)$ and the compensation amount Zum of the molding part due to the second undulation component are added, such that the compensation formula $Zm(x)$ of the first molding part is obtained. Since the compensation amount of the first molding part does not vary in the Y-direction, the compensation formula $Zm(x)$ of the first molding part, as it is, is made the compensation formula of the first molding part $Zm(x,y)$. With this, the process for calculating the compensation formula of the molding part in the main scanning direction is completed. Then, similar to the first embodiment, the molding part compensation formula for the sub-scanning direction is calculated, processing data of the second molding part is generated, and the first molding part is processed based on the processing data.

As explained above, in the second embodiment, the second undulation component in the main scanning direction (the second wavelength component) is extracted from the shape data of the first molding part. This method is effective when a copying of the second undulation component from the first molding part to the lens 10 is accurate. The first undulation component obtained in the first embodiment contains noise on a longer wavelength side and on a shorter wavelength side than the wavelength region (3 mm to 9 mm) of the second undulation component to be extracted. A band-pass filtering is performed to remove the noise, however, a perfect removal is highly difficult. The noise on the longer wavelength side is generated mainly due to a poor copying when molding. In other words, if an amplitude and a phase of the second undulation component of the first molding part are in agreement with an amplitude and a phase of the second undulation component of the lens 10, extracting the second undulation component based on the shape data of the first molding part contains less noise, enabling a higher precision compensation of the second undulation component.

Hereafter, a third embodiment of the present invention is explained.

The third embodiment differs from the first embodiment in the process for calculating the molding part compensation formula in the main scanning direction (FIG. 7, and step 111 of FIG. 4), and the process for calculating the compensation formula of the molding part in the sub-scanning direction (FIG. 10, and step 113 of FIG. 4). Here, a molding part 20 with which the lens 10 having the same shape as the first embodiment is to be molded with the same resin as the first embodiment, is explained, focusing to differences from the first embodiment. In the third embodiment, the first molding part is produced based on the shape targeted of the lens 10, and the first molding part is processed based on the shape errors contained in the lens 10 molded by using the first molding part, which is made the second molding part, i.e., the molding part 20. Accordingly, it is premised that the first molding part has been produced and the lens 10 has been molded, similarly to the first embodiment. Here, a special attention is called for, that is, in the third embodiment, the first direction is the sub-scanning direction and the second direction is the main scanning direction, which is opposite to the first and the second embodiments.

Figure 17:
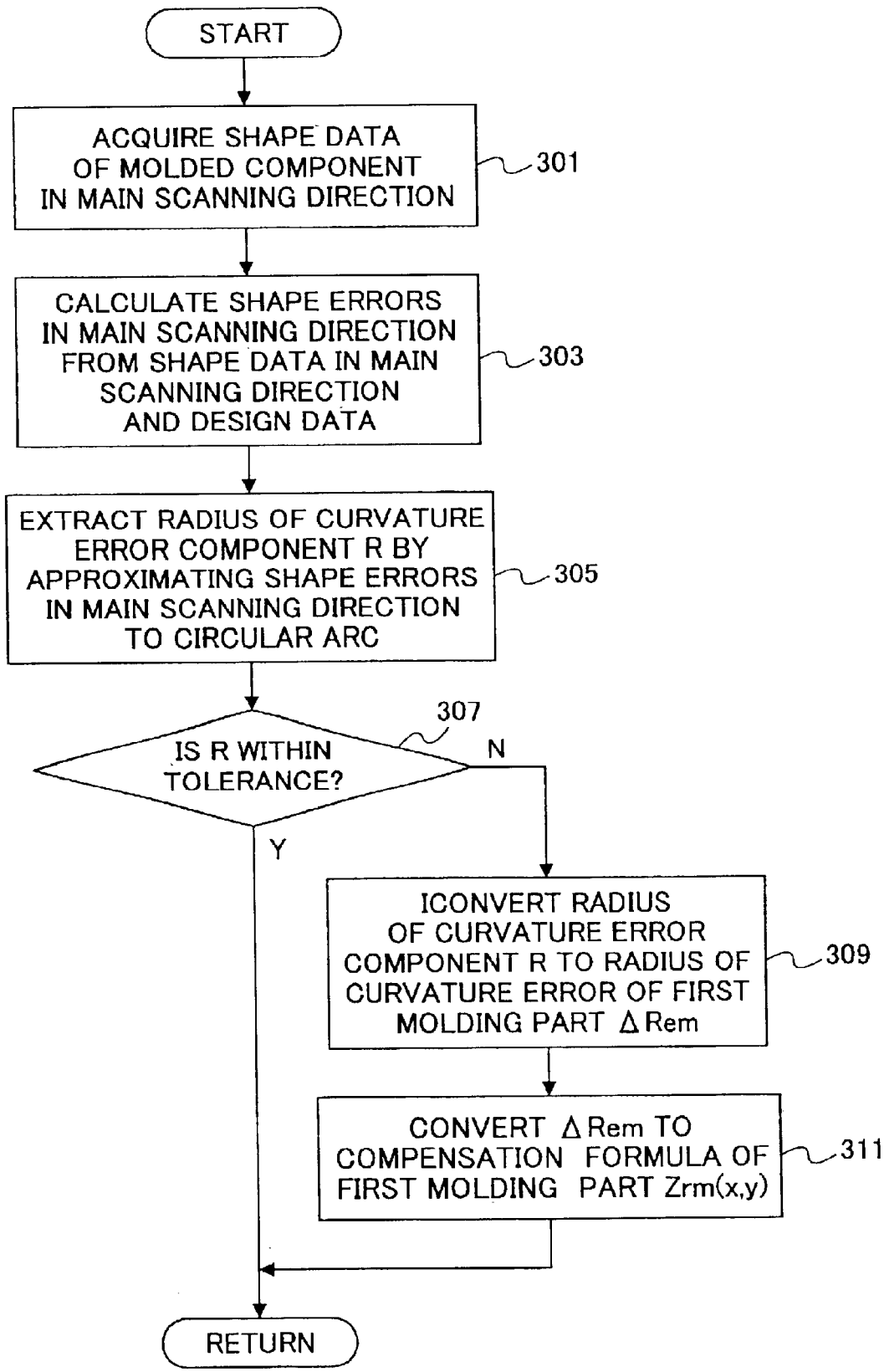
FIG. 17 is a flowchart explaining a calculation process of a compensation amount of the molding part in the main scanning direction in a third embodiment of the injection mold production method of the present invention.

First, a process for calculating the shape compensation formula in the main scanning direction (the second direction) is explained, using a flowchart of FIG. 17.

At step 301 of FIG. 17, a super-high precision three-dimensional measuring instrument (not shown) measures the lens shape, and shape data in the main scanning direction is obtained. Here, similar to the first embodiment, three scanning lines are provided. The shape data obtained about the scanning lines are averaged to make actual measurement data in the main scanning direction.

At step 303, shape errors in the main scanning line are obtained as differences between the actual measurement data in the main scanning line and the designed values in the main scanning line.

At step 305, the shape errors are approximated to a circular arc, and a curvature component R of the shape errors (the third wavelength,component, henceforth called an error R) is extracted.

At step 307, it is checked whether the error R is within a predetermined tolerance. If it is determined that the error R exceeds the predetermined tolerance (N at step 307), a correction of the error R is necessary, and the process proceeds to step 309.

At step 309, the error R is converted to a radius of curvature error ΔRem, taking a molding contraction ratio of the resin in the XZ plane into consideration.

At step 311, a compensation amount Zrm(x) of the first molding part is obtained from the radius of curvature error ΔRem, using a formula (8) that follows.

$$Zrm(x)=Rem-(Rem^2-x^2)^{1/2} \qquad (8)$$

Here, Rem is a radius of curvature that considers the radius of curvature error ΔRem. Since the compensation amount does not vary in the Y-direction, the compensation amount Zrm(x) is made a compensation formula Zrm(x,y). With the conversion finished in this manner, the process for calculating the molding part compensation formula in the main scanning direction is completed.

If, at step 307, the error R is determined to be within the tolerance (Y at step 307), no compensation of the error R is necessary. The process for calculating the compensation formula is finished, with zero being set to the compensation formula of the first molding part Zrm(x,y).

Figure 18:
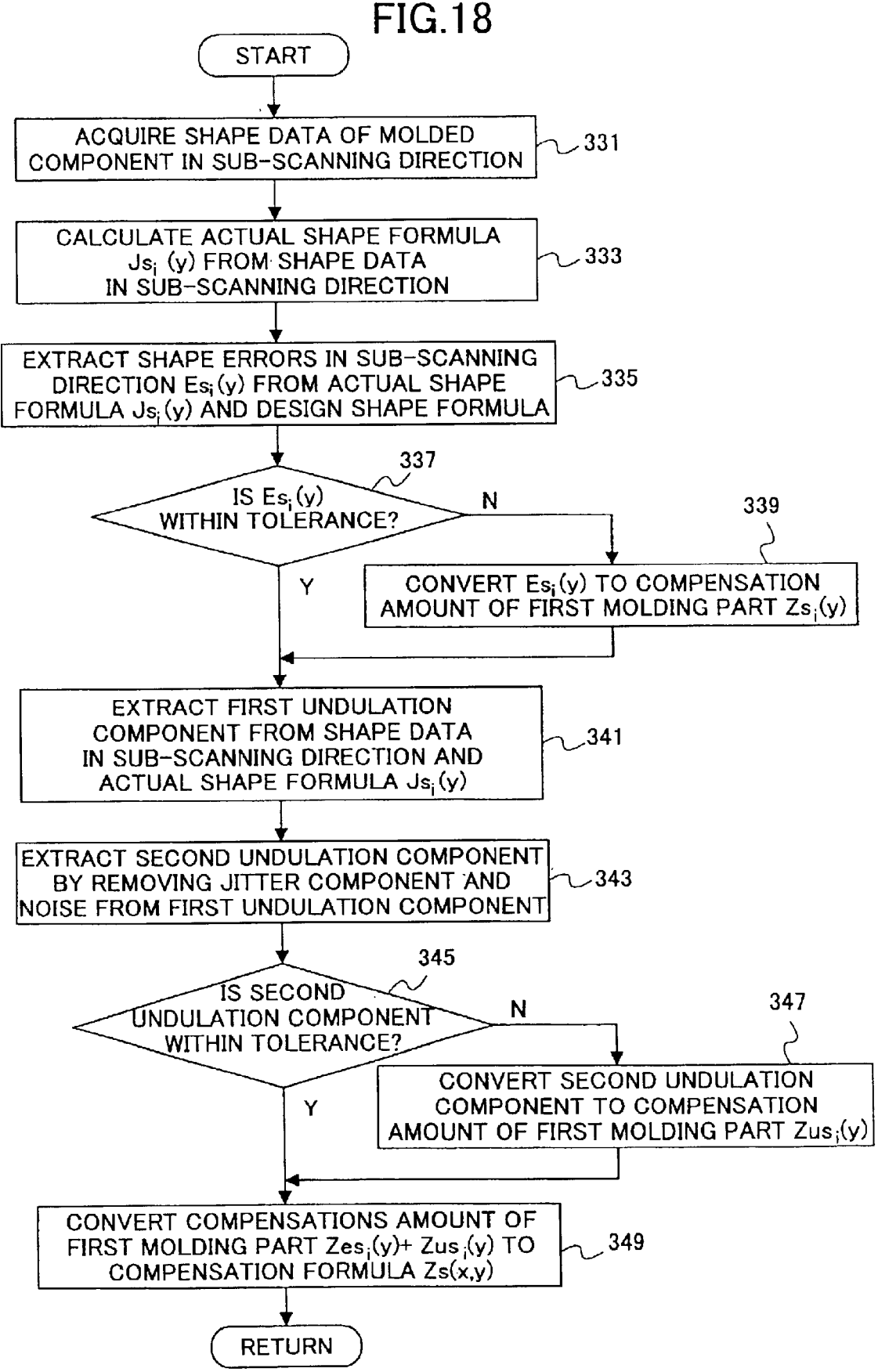
FIG. 18 is a flowchart explaining a calculation process of a compensation amount of the molding part in the sub-scanning direction in the third embodiment of the injection mold production method of the present invention.

Next, the process for calculating a molding part compensation formula in the sub-scanning direction (the first direction) is explained referring to a flowchart of FIG. 18.

At step 331, the super-high precision three-dimensional measuring instrument (not shown) measures the lens shape, and provides shape data in the sub-scanning direction (actual measurement data in the sub-scanning direction). A plurality of scanning lines are set, for each of which the actual measurement data in the sub-scanning direction is obtained.

At step 333, the actual measurement data in the sub-scanning direction of each scanning line is applied to a polynomial, and an actual shape formula $Js_i(y)$ (i=1 through the number of scanning lines) is obtained, using, e.g., a least squares method. Namely, $Js_1(y)$, $Js_2(y)$, $Js_3(y)$ and so on are obtained.

At step 335, differences between the actual shape formula $Js_i(y)$ and the designed shape formula are obtained for each of the scanning lines, and a shape error in the sub-scanning direction $Es_i(y)$ is extracted. That is, $Es_i(y)$ represents the long wavelength component (the first wavelength component) of the shape error in the sub-scanning direction.

At step 337, it is checked whether the shape error in the sub-scanning direction $Es_i(y)$ is within a predetermined tolerance for each of the scanning lines. If $Es_i(y)$ exceeds the tolerance, that is, N at step 337, the shape error in the sub-scanning direction $Es_1(y)$ needs to be compensated, and the process proceeds to step 339 If a shape error of at least one scanning line exceeds the tolerance, compensation of all the scanning lines is performed.

At step 339, $Es_i(y)$ of each of the scanning lines is converted to a compensation amount of the first molding part $Zes_i(y)$, considering the rate of molding contraction in the main scanning direction and in the Z-direction.

If, at step 337, the shape errors in the sub-scanning direction of all the scanning lines are within the predetermined tolerance, that is, Y at step 337, no compensation of the shape errors $Es_i(y)$ is necessary. The process proceeds to step 341, with zero being set to the compensation amount of the first molding part $Zes_i(y)$.

At step 341, differences between the actual measurement data in the sub-scanning direction and the actual shape formula $Js_1(y)$ are obtained, such that a first undulation component is extracted.

At step 343, the first undulation component is processed through a band-pass filter, such that a jitter component and noise are removed, and a second undulation component (second wavelength component) is extracted. At step 345, it is checked whether a PV value of the second undulation component is within a predetermined tolerance for every scanning line. Here, if the PV value of the second undulation component exceeds the predetermined tolerance (N at step 345), a compensation of the second undulation component is necessary, and the process proceeds to step 347. If at least one PV value of the second undulation of any of the scanning lines exceeds the predetermined tolerance, the compensation is performed to all the scanning lines.

At step 347, the second undulation component is converted to a compensation amount of the first molding part $Zus_i(y)$ for each scanning line. In order that a wave shape of the second undulation component is aligned to the first molding part, the second undulation component is expended in the sub-scanning direction using the molding contraction rate in the Y-direction. If, at step 345, the PV values of the second undulation component of all the scanning lines are within the tolerance (Y at step 345), no compensation of the second undulation component is necessary. The process proceeds to step 349, with zero being set to the compensation amount of the first molding part $Zus_1(y)$.

At step 349, a compensation amount of the first molding part $Zs_1(y)$ is obtained for each scanning line by adding the compensation amount of the first molding part due to the long wavelength component $Zes_i(y)$ and the compensation amount $Zus_i(y)$ of the first molding part due to the second undulation component. Values obtained to each scanning line by the compensation formula $Zs_i(y)$ are smoothened by interpolation, such that a compensation formula of the first molding part Zs(x,y) is obtained. In this manner, the process for calculating the compensation formula of the molding part in the sub-scanning direction is completed Next, processing data of the second molding part is generated from the compensation formula of the first molding part Zrm(x,y) in the main scanning direction and the compensation formula of the first molding part in the sub-scanning direction Zs(x,y). The first molding part is processed based on the processing data, similarly to the first embodiment.

As explained above, in the third embodiment, the long wavelength component (the first wavelength component) and the second undulation component (the second wavelength component) are extracted based on the shape data in the sub-scanning direction (the first direction) of the lens 10, and the radius of curvature error (the third wavelength component) is extracted based on the shape data in the main scanning direction (the second direction) of the lens 10. Compensation process is performed such that these errors are suppressed within the predetermined tolerance. For this reason, producing the second molding part according to the third embodiment is desired when the second undulation component in the sub-scanning direction is a critical factor to the optical properties of the lens 10.

Figure 19:
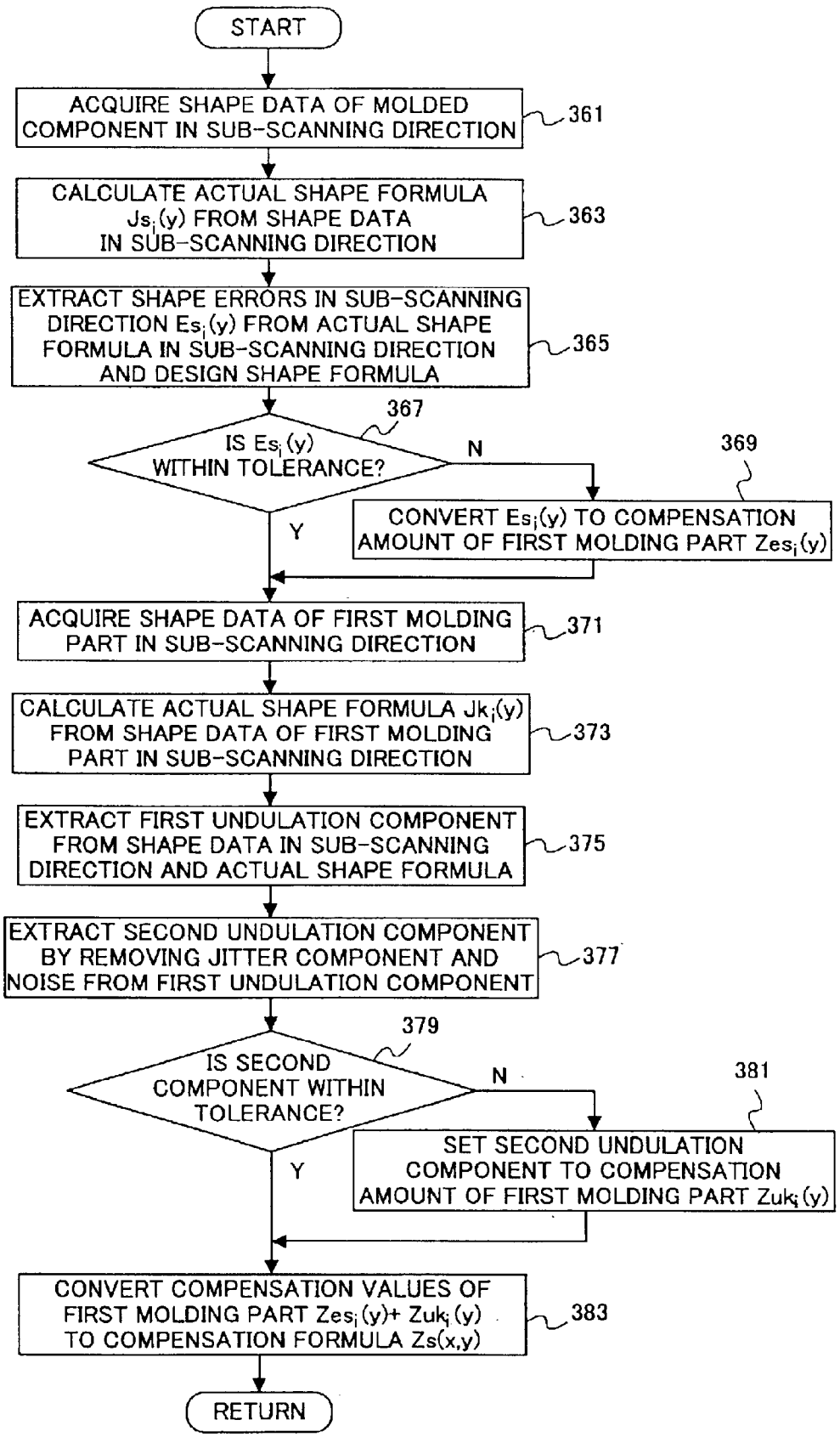
FIG. 19 is a flowchart explaining a calculation process of a compensation amount of the molding part in the sub-scanning direction in a fourth embodiment of the injection mold production method of the present invention.

Hereafter, the fourth embodiment of the present invention is explained. The fourth embodiment differs from the third embodiment only in the process (FIG. 18) for calculating the compensation formula of the molding part in the sub-scanning direction (the first direction). Therefore, explanations, based on a flowchart of FIG. 19, are centered on differences from the third embodiment given in the flowchart of FIG. 18. In the fourth embodiment, the first molding part is produced based on the designed shape of the lens 10, which is corrected based on the designed shape and shape errors contained in the lens 10 that is molded by using the first molding part, and made the second molding part 20. It is premised that processes up to the process for calculating the molding part compensation formula in the main scanning direction (the second direction) have been finished, similar to the third embodiment.

Step 361 through step 369 of FIG. 19 are the same as the step 331 through step 339 of the third embodiment. Therefore, explanations are not repeated. At step 371, the super-high precision three-dimensional measuring instrument (not shown) measures the shape of the first molding part in the sub-scanning direction, and generates shape data (actual measurement data of the molding part). Here, the measurement is performed for a plurality of scanning lines, similar to measuring the lens shape. The actual measurement data is obtained for each of the scanning lines.

At step 373, the actual measurement data of each of the scanning lines is applied to a polynomial, such that an actual shape formula $Jk_i(y)$ (i=1 through the number of the scanning lines) is obtained, using, e.g., a least squares method. Here, in this embodiment, a 4-degree polynomial is used for example. The actual shape formula $Jk_i(y)$ represents a long wavelength component contained in the actual measurement data.

At step 375, a first undulation component contained in the actual measurement data is extracted from differences between the actual measurement data of the molding part and the actual shape formula $Jk_i(y)$ for every scanning line. The first undulation component contains wavelengths shorter than 1 mm, such as a jitter and noise that does not critically affect the optical properties of the lens 10.

Then, at step 377, the jitter and noise contained in the first undulation component for every scanning line are removed by passing through a band-pass filter, and a second undulation component (the second wavelength component) containing components in a wavelength range between 3 mm and 9 mm is extracted.

At step 379, it is checked whether PV values of the second undulation component of each of the scanning lines are within a predetermined tolerance. If a PV value of the second undulation component exceeds the predetermined tolerance (N at step 379), compensation of the second undulation component is required, and the process proceeds to step 381. At step 381, the second undulation component of each of the scanning lines is set to a compensation amount of the first molding part due to the second undulation component for each of the scanning lines $Zuk_i(y)$. Here, since the actual measurement data of the first molding part is used, no conversion in consideration of the molding contraction ratio of the resin is required. The process proceeds to step 383.

If, at step 379, the PV value of the second undulation component is within the predetermined tolerance (Y at step 379), no compensation of the second undulation component is necessary, and the process proceeds to step 383, with zero being set to the compensation amount $Zuk_i(y)$.

At step 383, the compensation amount $Zes_i(y)$ and the compensation amount $Zuk_i(y)$ due to the second undulation component are added, and a compensation formula $Zs(x,y)$ is obtained. With this, the process for calculating the compensation formula of the molding part in the sub-scanning direction is completed.

Then, similar to the third embodiment, processing data is generated, and the first molding part is processed, based on the processing data.

As explained above, in the fourth embodiment, the second undulation component in the sub-scanning direction is extracted from the shape data of the first molding part, which is the difference from the third embodiment. Where an amplitude and a phase of the second undulation component obtained from the shape data of the first molding part are in agreement with an amplitude and a phase of the second undulation component contained in the lens 10, the second undulation extracted based on the shape data of the first molding part contains less noise, therefore, a more accurate compensation of the second undulation is possible.

According to the production method of the injection mold in the present invention, such as described by the embodiments above, the first molding part is processed such that a plurality of wavelength components of errors that adversely affect the optical properties of the lens 10 are extracted, based on at least one of the surface shape of the cavity of the first molding part and the shape of the lens 10 molded by using the first molding part, and the first molding part is processed to be made the second molding part that has the plurality of the wavelength components that are within the predetermined values, based on the wavelength components extracted. The wavelength component that adversely affects the optical properties of the lens 10 is selectively reduced in the second molding part. Therefore, according to the embodiments, the molding part that can mold the lens 10 that can surely provide the designed optical properties can be efficiently produced.

In the first and the second embodiments, the second undulation components are taken as discrete data. However, an approximation to a function may be performed instead.

Furthermore, in the embodiments above, the least squares method is used when obtaining the actual shape formula from the shape data. However, other various regression methods can be used, such as a least attenuated squares method.

In the above embodiments, the first molding part is reworked based on the compensation formula, which becomes the second molding part. However, a new design formula for a surface shape of a cavity of the second molding part can be generated, reflecting the compensation formula to the design formula of the first molding part, and a fresh second molding part can by produced based on the new design formula.

Although the above embodiments used amorphous polyolefin resin as the material for molding the lens 10, the material is not limited to this. The material for molding a transparent optical component can be any thermal plastic amorphous resin of which softening temperature is glass transition temperature, such as poly meta-acrylic resin, polycarbonate resin, alicyclic acrylic resin, cyclic olefin copolymer, etc. Materials for molding a non-transparent optical component, such as a mirror, can further include crystalline resin softening temperature of which is melting temperature. Other than the thermal plastic resins above, thermal hardening resin, optical hardening resin, glass and the like can be used as the molding material.

Although the lens 10 was injection-molded in the embodiments above, the present invention can apply to other plastic molding methods, such as compression molding, blow molding, gas injection molding, thermal press molding, and low pressure molding that guides a surface sink as disclosed by Japanese Patent 6-304973, Japanese Patent 11-028745, and so on. Further, the present invention is applicable to a hybrid lens process that forms an optically hardening resin on a surface of a glass material, and glass pressing molding using a glass plate as the molding material. That is, the present invention is applicable to a shape-copying molding using a molding material that inflates and contracts at processing.

Furthermore, although the above embodiments were made with a metal mold, the present invention also applies to a mold made from nonmetal, such as ceramics.

The degree of the polynomial that is used for approximation is variable, according to a required accuracy, and a magnitude of shape errors.

Although the embodiments were described about an optically functional surface being a convex, the present invention can apply to other shapes, such as a plane. Even if the shape of the optically functional surface cannot be expressed by the formula (1), the present invention can be applied so long that the shape of the optically functional surface can be expressed by any function.

Although a super-high precision three-dimensional measuring instrument was used when measuring the surface shape of the cavity of the first molding part and the shape of the lens 10 molded by the first molding part, the measuring instrument may be either contact type or non-contact type. Accuracy required of the measuring instrument varies depending on an accuracy required of the molded component. Further, if the optically functional surface of a target optical component is a sphere, a Fizeau interferometer may be used, instead of the super-high precision three-dimensional measuring instrument.

The conversion formula that obtained the staying period of the polishing tool of the NC machine in the embodiments is dependent on a space frequency of the compensation amount. If necessary, the compensation amount can be divided into appropriate space frequency segments for each of which a staying period is calculated, and the staying period is integrated into one set of NC data.

In addition, although the embodiments considered the wavelength region from 3 mm to 9 mm as the second undulation component, the wavelength region to be considered as the second undulation component is variable, according to the shape of the molded component, and usage. The wavelength region can be adjusted by changing a set-up of the band-pass filter used in extracting the second undulation component from the first undulation component.

As previously described, if there is a shape error on the surface of the optically functional surface of a lens that is used as a scanning lens (a scanning lens for image forming), the focus does not come to a designed focus position, and the diameter of the light beam grows beyond a designed value. These deteriorate an image quality.

Figure 20A:
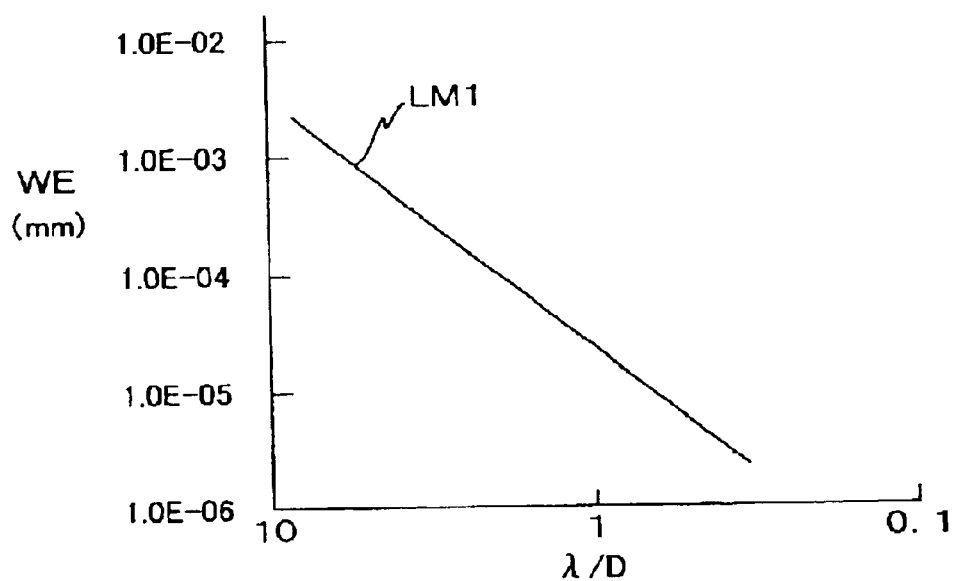
FIG. 20A is a graph for explaining effects of a beam diameter of a light flux input to a scanning lens D, space wavelength of shape errors λ, and an amount of the shape errors WE, where an effect influencing to a tolerance value of focal point deviation is shown.

The inventors here, et al. have determined relationships among a diameter D of an optical flux beam that is input to the scanning lens, a shape error amount WE, and a wavelength of the shape error $\lambda$ by a simulation, when an offset amount of the focus agrees with a predetermined tolerance As shown in FIG. 20A, it was determined that the smaller the wavelength $\lambda$ is in comparison with the beam diameter D, an allowable shape error amount is the smaller, as indicated by a straight line LM1. In an image forming apparatus (such as a facsimile apparatus and a copying machine), a focus depth of an optical scanning system is about a few mm, and in view of an assembling accuracy of components such as a photo conductor and a reflection mirror, an allowable amount of the focus offset becomes even smaller. In the simulation, a two-lens (four optically functional surfaces) scanning system is considered, and an allowable amount of the focus offset of 0.2 mm, for example, per optically functional surface was used, while considering the assembling accuracy of the components.

Figure 20B:
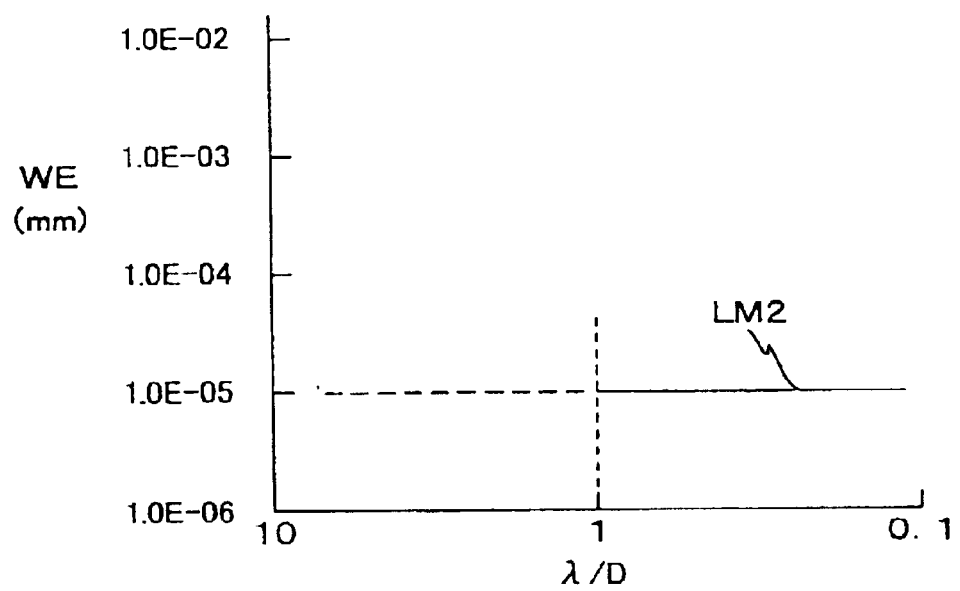
FIG. 20B is a graph for explaining an effect influencing to a tolerance value of the beam diameter growth.

Similarly, a simulation was performed to obtain relationships among the diameter of the optical flux beam D that is input to the scanning lens, the shape error amount WE, and the wavelength of the shape error $\lambda$, when a growth amount of the beam diameter agrees with a predetermined tolerance. The result is given in FIG. 20B. As shown there, a straight line LM2 indicates that the relationships of WE to $\lambda/D$ are nearly flat. Because an adverse effect of the beam diameter growth is present only in an area where $\lambda/D$ is 1 or smaller, the line LM2 is given in a dotted line where $\lambda/D$ is 1 or greater. Although an allowable growth of the beam diameter is dependent on sensitivity of the photo conductor, the present simulation employed 12% of a designed beam diameter as a tolerance, for example.

Figure 21A:
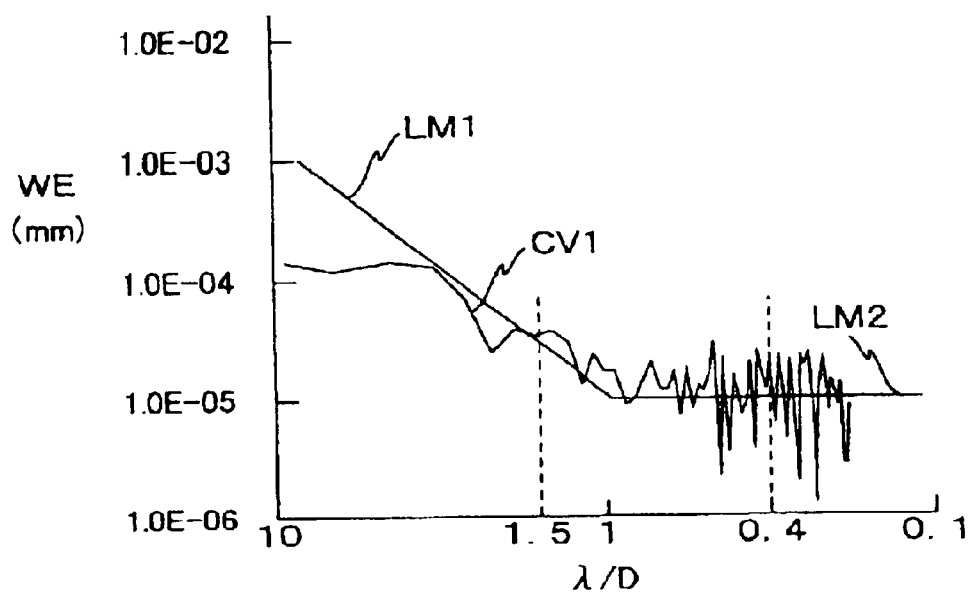
FIG. 21A is a graph showing the Fourier transformation of shape errors of a scanning lens in the main scanning direction in the case of a scanning lens molded by a conventional injection mold.
Figure 21B:
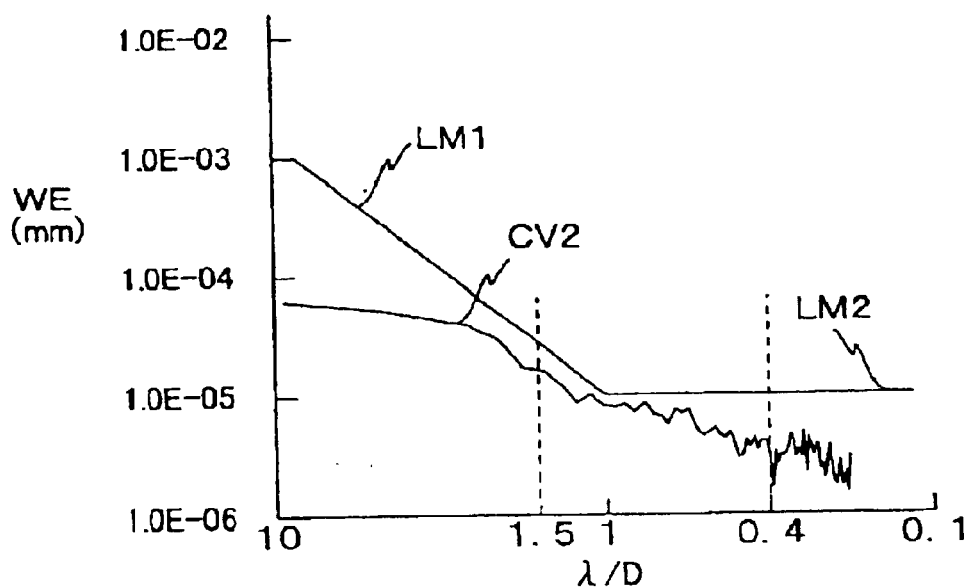
FIG. 21B is a graph showing the case of a scanning lens molded by an injection mold of the present invention.
Figure 22A:
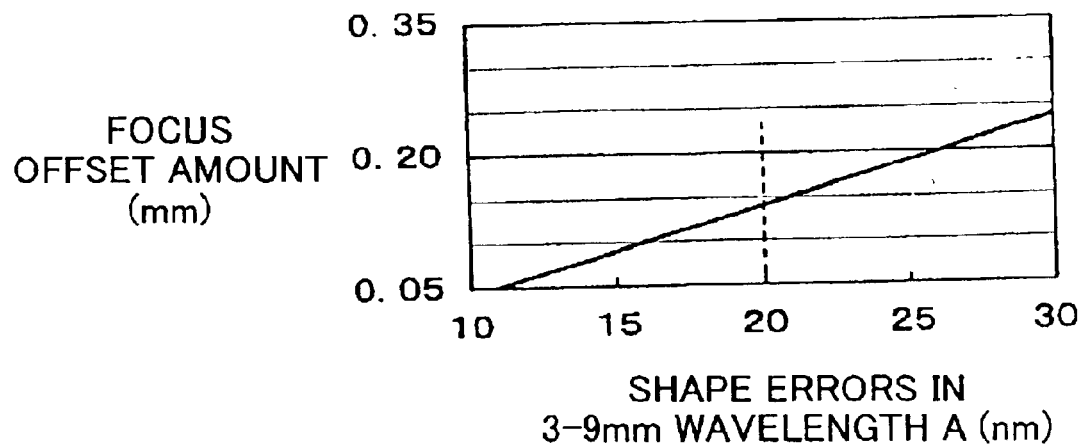
FIG. 22A is a graph showing a relationship between the shape errors and an focal point deviation amount at a wavelength range between 3 mm and 9 mm.
Figure 22B:
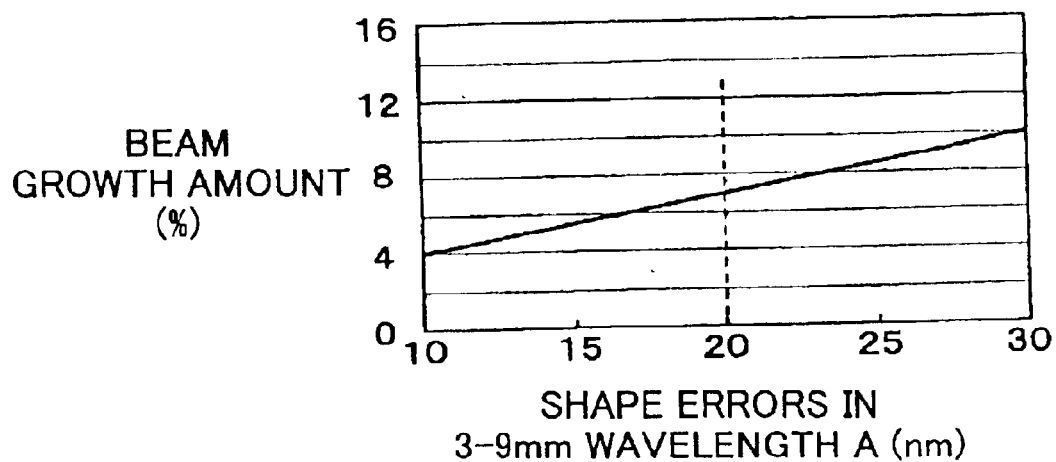
FIG. 22B is a graph a relationship between the shape errors and a beam diameter growth amount at a wavelength range between 3 mm and 9 mm.
Figure 23A:
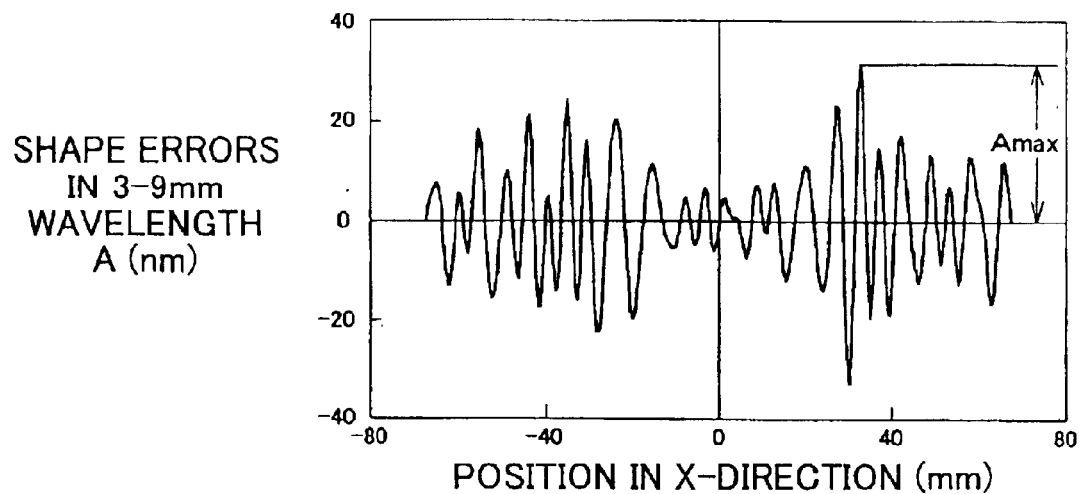
FIG. 23A is a graph for explaining wavelength components between 3 mm and 9 mm of the shape errors contained in the shape errors of a scanning lens molded by the conventional injection mold.
Figure 23B:
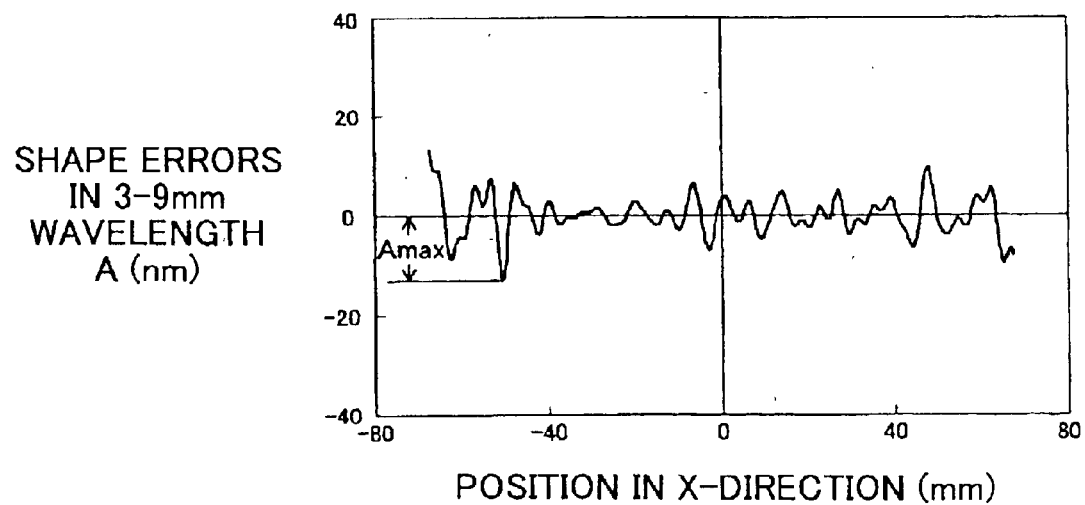
FIG. 23B is a graph for explaining wavelength components between 3 mm and 9 mm of the shape errors contained in the shape errors of a scanning lens molded by the injection mold of the present invention.
Figure 24:
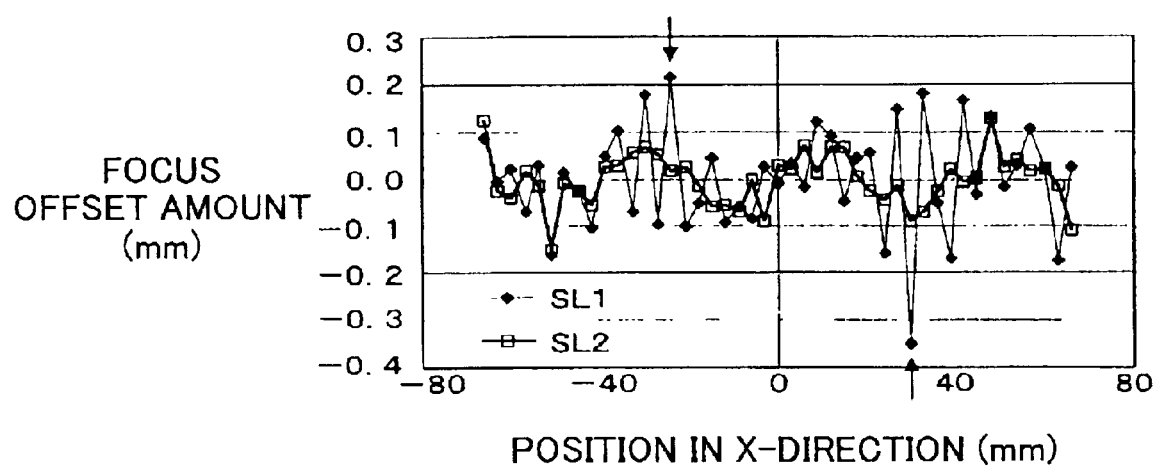
FIG. 24 is a graph for explaining a focal deviation amount of an optical system structured by two scanning lenses.

Results of the above simulations and actual measurement of shape errors contained in the scanning lens were compared. Here, it has been known that when the wavelength $\lambda$ is greater than the beam diameter D, a governing factor of an image quality is the focus offset, and when the wavelength $\lambda$ is smaller than the beam diameter D, the governing factor of the image quality is the beam diameter growth. In view of this knowledge, comparisons are made with the LM1 where $\lambda/D$ is greater than 1, and with the LM2 where $\lambda/D$ is smaller than 1, as shown in FIG. 21A. In FIG. 21A, data CV1 compared with the LM1 and LM2 is shown, where the data CV1 represents the Fourier transformation of an example of actual measurement data of shape errors in the mother line direction of the optically functional surface of a scanning lens molded by a conventional injection mold. In FIG. 21B, data CV2 compared with the LM1 and LM2 is shown, where the data CV2 represents the Fourier transformation of an example of actual measurement data of shape errors in the mother line direction of the optically functional surface of a scanning lens molded by an injection mold of the present invention. As evidenced from the two sets of the comparisons, the scanning lens molded by using the injection mold of the present invention contains less shape errors than the scanning lens molded by the conventional injection mold in almost all wavelengths, and less than LM1 where $\lambda/D$ is greater than 1, and less than LM2 where $\lambda/D$ is smaller than 1.

The above-mentioned straight line LM1 and a straight line LM2 are based on an assumption that the shape errors contain only one wavelength. However, a plurality of wavelengths are contained in an actual optically functional surface. In this view, an estimating method was developed in order to obtain more accurate focus offset amount and beam diameter growth amount, considering a compounded effect of the plurality of wavelengths contained in the shape errors. Here, an example is described by a formula (9), where n wavelength components ($\lambda_1, \lambda_2, \lambda_3$, through $\lambda_n$) are assumed present in the shape error. Further, $FA_1, FA_2, FA_3$, through $FA_n$, are the Fourier transformations of the actual measurement values of the shape errors contained in the scanning lens. Further, values ($a_1, a_2, a_3$, through $a_n$) are inverse numbers of the tolerance values for the shape errors at each wavelength, which are obtained from the straight line LM1, and serve as weight indices to the focus offset amounts of the wavelengths. The formula (9) defines FA as a square root of a sum of squares of the inverse values and the Fourier transformation values.

$$FX = \{(a_1 FA_1)^2 + (a_2 FA_2)^2 + \ldots + (a_n FA_n)^2\}^{1/2} \qquad (9)$$

Then, the focus offset value where there are a plurality of wavelengths contained in the shape errors MF is estimated by applying the FX value to a predetermined function that provides a relationship between the shape errors and the focus offset value, as shown in the following formula (10).

$$MF = P(FX) \tag{10}$$

Further, a formula (11) defines DX, wherein $b_1$, $b_2$, $b_3$, through $b_n$ are inverse of the tolerance values of the shape errors at each of the wavelengths obtained from the straight line LM2, which serve as weight indices to beam growth values at each wavelength. The weight indices are multiplied to the Fourier transformation of the shape errors, $FA_1$, $FA_2$, $FA_3$, through $FA_n$. The DX is defined as a square root of a sum of squares of multiplication results of the weight indices and the Fourier transformation values.

$$DX = \{(b_1 FA_1)^2 + (b_2 FA_2)^2 + \ldots + (b_n FA_n)^2\}^{1/2} \tag{11}$$

The DX is applied to a predetermined function Q that gives a relationship between the shape errors and the beam diameter growth, as shown in a formula (12). A beam diameter growth amount MB where there are a plurality of wavelengths in the shape error is estimated by using the formula (12).

$$MB = Q(DX) \tag{12}$$

By examining the focus offset amount and the beam growth amount of various wavelength according to the above formulas, it was determined that shape error components in a specific wavelength region that is given by a formula (13) (specific wavelength components) were critically affecting the focus offset amount and the beam growth amount.

Figure 25:
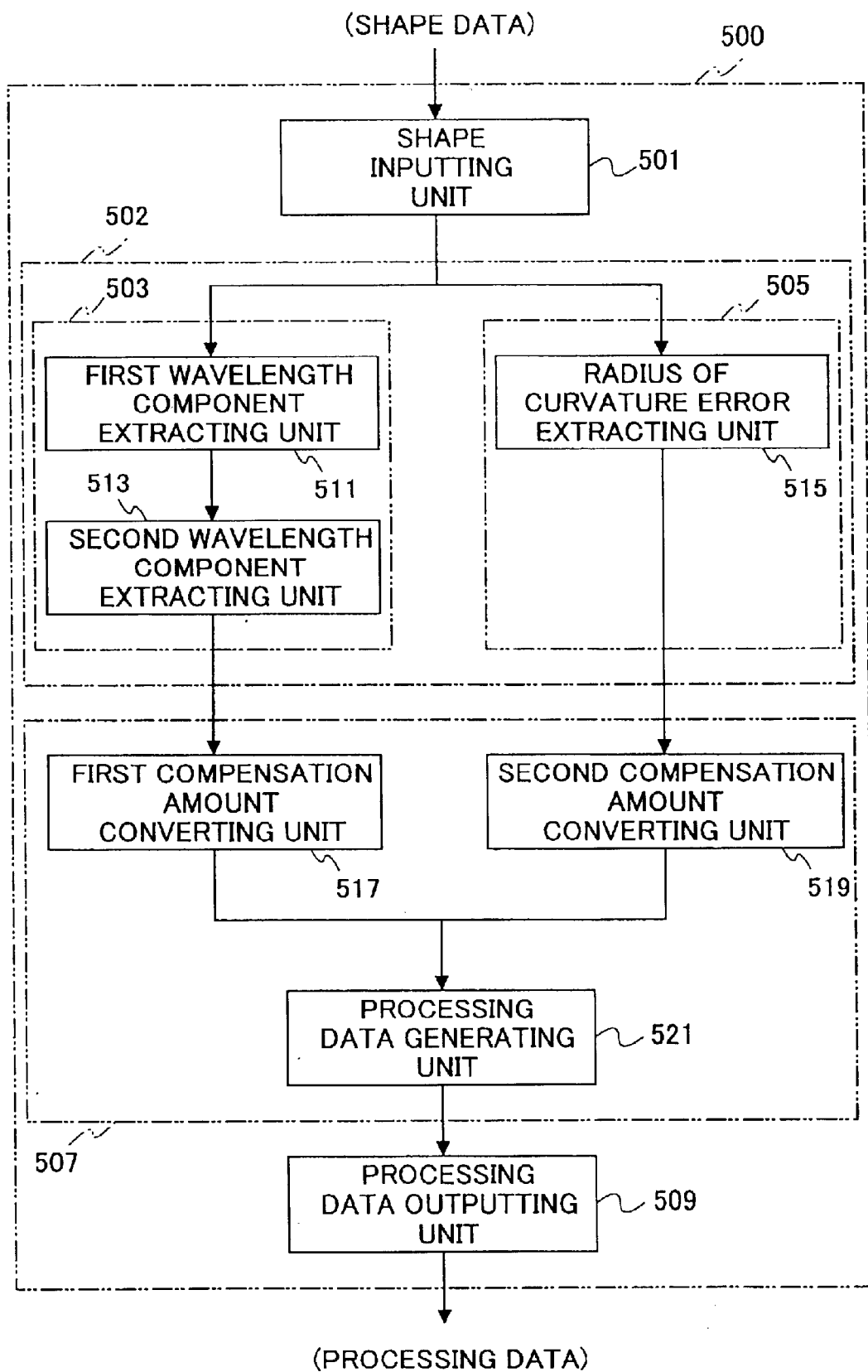
FIG. 25 is a block diagram of a designing apparatus of the injection mold of the present invention.

Next, an embodiment of a designing apparatus 500 of the injection mold of the present invention is explained based on FIG. 25.

FIG. 25 is a block diagram showing functions of the designing apparatus 500 of the injection mold of the present invention. The designing apparatus 500 includes a shape inputting unit 501 that inputs at least one of a set of measurement data of a surface shape of a cavity of a molding part and a set of measurement data of a molded component to which the surface shape is copied, an error component extracting unit 502 that extracts a plurality of wavelength components contained in the molded component based on the measurement information, a processing information generating unit 507 that generates processing information for processing the surface shape of the cavity of the molding part such that at least one of the wavelength components extracted is reduced, and a processing information outputting unit 509 that outputs the processing information.

Here, the error component extracting unit 502 includes a first direction error component extracting unit 503 that extracts a first wavelength component and a second wavelength component of the shape errors in the first direction, and a second direction error component extracting unit 505 that extracts a radius of curvature error in a second direction. The first direction error component extracting unit 503 includes a first wavelength component extracting unit 511 that extracts the first wavelength component, and a second wavelength component extracting unit 513 that extracts the second wavelength component. Further, the second direction error component extracting unit 505 includes a radius of curvature error extracting unit 515.

The processing information generating unit 507 includes a first compensation amount converting unit 517 that determines a compensation amount of the molding part, based on at least one of the first wavelength component and the second wavelength component of the shape error extracted by the first direction error component extracting unit 503, a second compensation amount converting unit 519 that determines a compensation amount of the molding part, based on the radius of curvature error extracted by the second direction error component extracting unit 505, and a processing data generating unit 521 that generates processing data of the molding part, based on at least one of the compensation amount determined by the first compensation amount converting unit and the compensation amount determined by the second compensation amount converting unit.

Next, a design method of the injection mold by the designing apparatus 500 is briefly explained.

When at least one of the set of measurement data of the surface shape of the cavity of the molding part, and the set of measurement data of the molded component to which the surface shape is copied is input, the shape inputting unit 501 transfers such measurement data to the first direction error component extracting unit 503, and the second direction error component extracting unit 505.

In the first direction error component extracting unit 503, the first wavelength component extracting unit 511 extracts the first wavelength component contained in the shape errors in the main scanning direction (the first direction), based on the surface shape data of the cavity of the molding-part, or the shape data of the molded component, included in the measurement data. Further, the second wavelength component extracting unit 513 extracts the second wavelength component contained in the shape errors in the first direction. Here, the first wavelength component and the second wavelength component are extracted according to calculations similar to the production method of the injection mold, as described above.

In the second direction error component extracting unit 505, the radius of curvature error extracting unit 517 extracts the error of the radius of curvature in the sub-scanning direction (the second direction), based on the surface shape data of the cavity of the molding part, or the shape data of the molded component, included in the measurement data. The radius of curvature error is extracted according to calculations similar to the production method of the injection mold, as described above.

Then, the first compensation amount converting unit 517 determines a compensation amount of the molding part such that at least one of the first wavelength component and the second wavelength component is compensated, and the second compensation amount converting unit 519 determines the compensation amount of the molding part such that the radius of curvature error is compensated.

The processing data generating unit 521 generates the processing data of the molding part based on at least one of the compensation amounts in the first direction and the second direction.

The processing information outputting unit 509 outputs the processing data that is generated as above to a memory storage, a display unit, a processing machine and the like that are not shown in the attached drawings.

As explained above, according to the designing apparatus of the injection mold of the present embodiment, the surface shape of the cavity of the molding part is processed such that at least one of the wavelength components of the shape errors that adversely affect the properties of the molded component is reduced. As the result, an efficient designing of the injection mold that is appropriate to mold the molded component that surely realizes designed properties.

Here, in the above embodiment, the first direction was set as the main scanning direction and the second direction was set as the sub-scanning direction. However, the first direction may be set as the sub-scanning direction and the second direction may be set as the main scanning direction.

Designing of the injection mold can be performed by an injection mold designing computer executing a predetermined process according to a designing computer program of the injection mold of the present invention. In the following, control algorithm executed by a CPU of the injection mold designing computer according to the designing computer program is briefly explained, with reference to a flowchart of FIG. 26.

It is assumed, as a premise, that the injection mold designing computer (for example, an ordinary personal computer, a workstation, and the like) not shown in the attached drawings stores the injection mold designing computer program of the present invention in a memory storage that also stores injection mold designing formulas.

Figure 26:
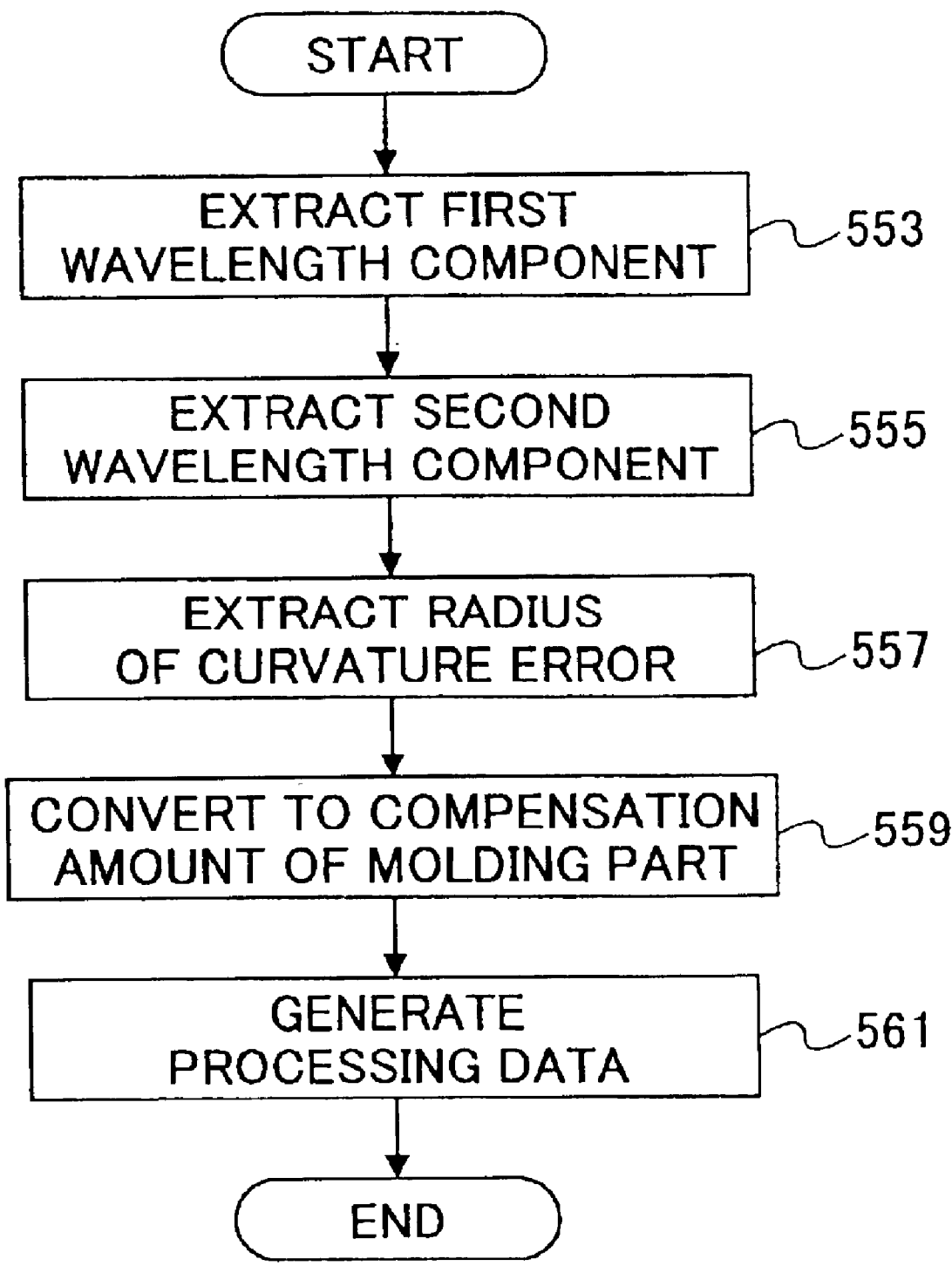
FIG. 26 is a flowchart explaining a computer program for a computer that designs the injection mold of the present invention.

The control algorithm that corresponds to a flowchart shown in FIG. 26 starts when the designing computer program is loaded from the memory storage to a main memory of the designing computer, according to a direction of an operator.

At step 553 of FIG. 26, the first wavelength component contained in the shape errors in the main scanning direction (the first direction) of the molded component is extracted, based on the shape measurement data of the molded component to which the surface shape of the cavity of the molding part is copied. Here, the shape errors are calculated using designed values stored in the memory storage of the molded component and the measurement data. The first wavelength component is obtained at this step 553 by the same technique as used in the production method of the molding part.

At step 555, the second wavelength component contained in the shape errors in the main direction is extracted, based on at least one of the surface shape of the cavity of the molding part and the shape of the molded component. The second wavelength component is obtained at this step 555 by the same technique as used in the production method of the molding part.

At step 557, the radius of curvature error (third wavelength component) in the sub-scanning direction (the second direction) is extracted. The radius of curvature error is extracted at this step 557 by the same technique as used in the production method of the molding part.

At step 559, the compensation amount of the molding part is obtained, which is to reduce at least one of the first wavelength component, the second wavelength component and the radius of curvature error that were extracted above.

At step 561, the processing data is generated based on the compensation amount of the molding part.

The processing data of the molding part, which is the result of the above execution, is stored in the memory storage, and displayed on a display apparatus (such as a CRT display) that is not shown.

As explained above, according to the injection mold designing computer program of this embodiment, processes of the step 553 through 561 are performed by the computer, such that a selected wavelength component of the shape errors that adversely affect the properties of the molded component is reduced.

That is, the injection mold designing computer program extracts a plurality of wavelength components of the shape errors that adversely affect the properties of the molded component, and obtains the processing data of the cavity of the molding part such that an amount of at least one of the wavelength components is reduced. Accordingly, the molded component produced by using the molding part processed based on the processing data surely realizes the designed properties. Thus, an efficient design of the molding part that is appropriate to produce the molded component that realizes the designed proprieties is realized.

Here, although the first wavelength component and the second wavelength component were extracted from the shape errors in the main scanning direction, and the radius of curvature error was extracted from the sub-scanning direction in the above-mentioned embodiment, the first wavelength component and the second wavelength component may be extracted from the sub-scanning direction, with the radius of curvature error being extracted from the main scanning direction.

Figure 27:
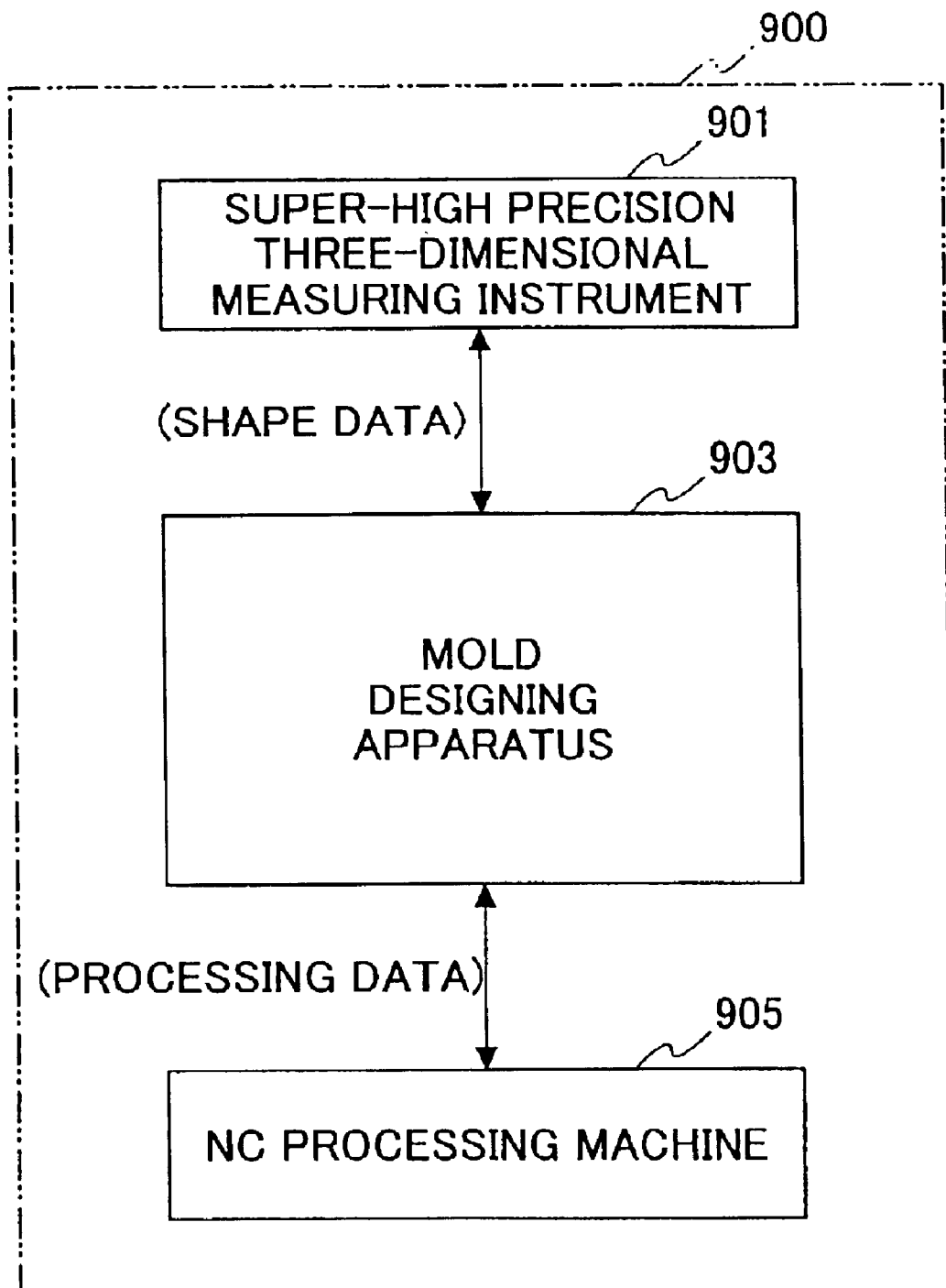
FIG. 27 is a block diagram explaining an embodiment of the production system for the injection mold of the present invention.

Next, an embodiment of the production system of the injection mold of the present invention is explained based on FIG. 27.

The production system of the injection mold 900 includes a super-high precision three-dimensional measuring instrument 901 that measures a shape, a shape designing apparatus 903 that serves as an information generating apparatus, and an NC processing machine 905 that serves as a processing machine.

Here, the shape designing apparatus 903 may include the injection mold designing apparatus described above, or may be the computer that is installed with the injection mold designing computer program described above.

The super-high precision three-dimensional measurement instrument 901, the shape designing apparatus 903, and the NC processing machine 905 are connected by a network, such as LAN.

The super-high precision three-dimensional measuring instrument 901 measures at least one of the surface shapes of the cavity of the first molding part and the molded component molded by the first molding part, and outputs measurement data to the injection mold designing apparatus 903 as the measurement data. The injection mold designing apparatus 903 extracts a plurality of wavelength components of the shape errors that adversely affect the properties of the molded component, and generates processing information to produce the second molding part such that at least one of the plurality of the wavelength components is selectively reduced in the surface shape of the cavity, and outputs the processing information to the NC processing machine 905. The NC processing machine 905 processes the surface shape of the cavity of the second molding part based on the processing information received from the injection mold designing apparatus 903.

In the present embodiment, in the case that the surface shape of the cavity of the first molding part is rework-processed to be made the second molding part, the first molding part, surface shape of which has been measured by the high-precision measuring instrument 901, is automatically transferred to the NC processing machine 905 and set at a predetermined location.

In the present embodiment, the super-high precision three-dimensional measuring instrument 901, the shape designing apparatus 903, and the NC processing machine 905 exchange information with each other in both directions, respectively, and an automated process is performed from measurement by the super-high precision three-dimensional measuring instrument 901 to processing by the NC processing machine 905. Operating conditions at each step of the measurement and the processing are monitored on a real-time basis by a supervisory apparatus not shown in the attached drawings.

Therefore, according to the injection mold production system 900 of the present embodiment, the injection mold that is appropriate to mold a component that realizes designed properties can be continuously and efficiently produced.

Although the above embodiment of the injection mold production system 900 was configured with the super-high precision three-dimensional measuring instrument 901, the shape designing apparatus 903, and the NC processing machine 905, configuration is not limited to this. The injection mold production system 900 may be structured with the shape designing apparatus 903 and the NC processing machine 905, in which case, measurement data is input to the shape designing apparatus 903 manually by an operation via an inputting means that is not shown in the attached drawings.

Next, embodiments of the optical system of the present invention is explained.

Figure 28:
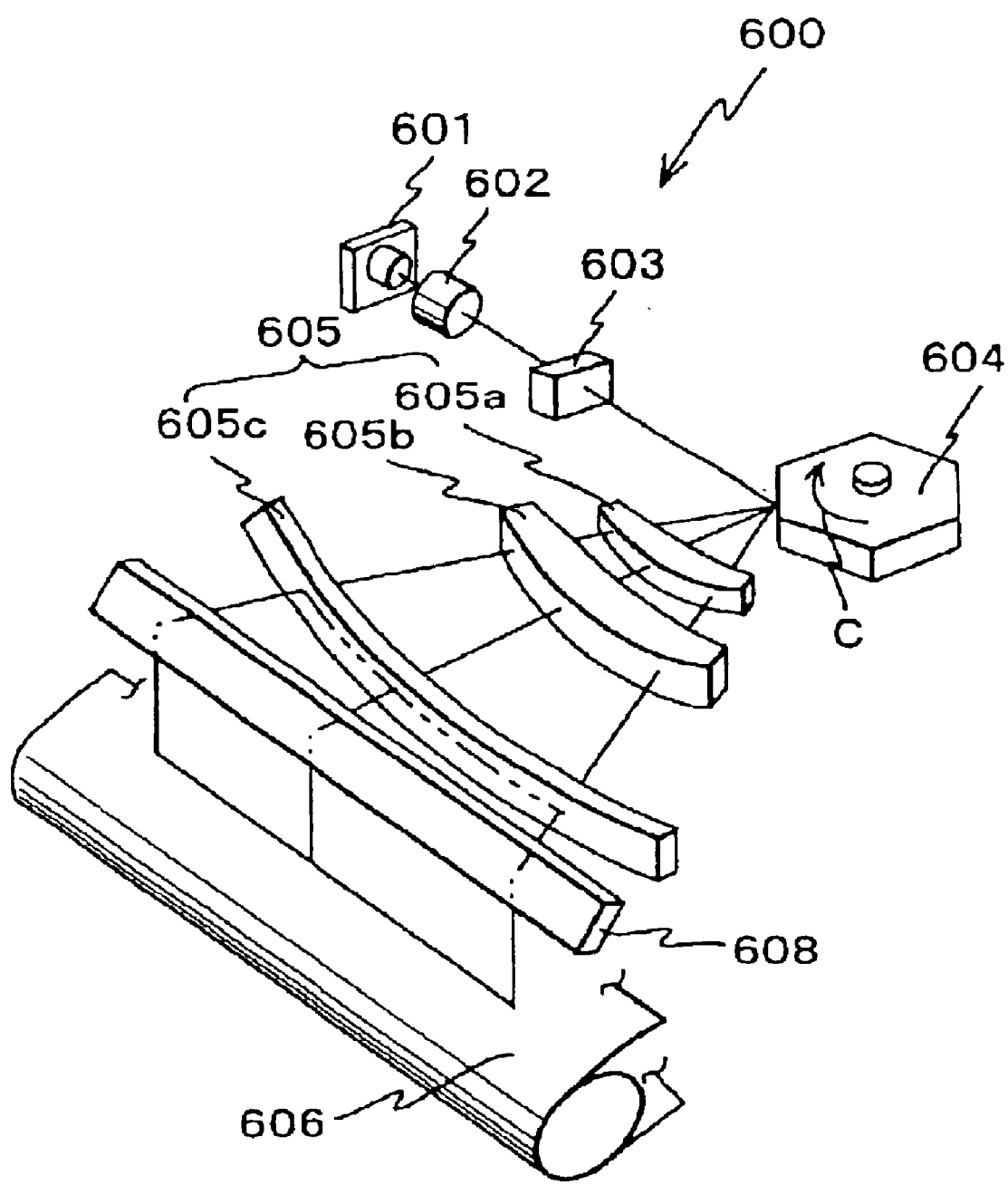
FIG. 28 is a figure for explaining a first embodiment of the optical system of the present invention.

A first embodiment of the optical system 600 is explained based on FIG. 28.

FIG. 28 shows an outline configuration of the optical system 600 of the present invention. The optical system 600 includes a semiconductor laser 601 as a light source, a rotating polygon mirror 604 that serves as a deflecting means having a deflecting surface that deflects an optical beam from the semiconductor laser 601 at a uniform angular velocity over a predetermined angle range, a laser scanning optical system 605 that converts the light beam deflected by the rotating polygon mirror 604 to a uniform velocity light beam, and a reflection mirror 608 that changes course direction of the light beam from the laser scanning optical system 605. Here, the laser scanning optical system 605 includes three scanning lenses 605a, 605b and 605c that are molded by, for example, injection molding using the injection mold produced according to the production method of the injection mold of the present invention.

Here, operations of the optical system 600 are briefly explained. The light beam that is emitted from the semiconductor laser 601 passes through a lens 602 and a lens 603, and reaches the rotating polygon mirror 604, forming an image nearby the deflecting surface. The rotating polygon mirror 604 rotates in a direction indicated by an arrow C in FIG. 28 at a constant speed. The light beam that is focused nearby the deflection surface is deflected at a uniform angular velocity, according to rotation of the rotating polygon mirror 604. The deflected light beam passes through each of the scanning lenses 605a, 605b and 605c, and converted to a light beam that scans a longitudinal direction (main scanning direction) of the reflecting mirror 608 at a uniform velocity over the predetermined angle range. Then, the light beam is reflected by the reflection mirror 608, and scans a surface of a photo conductor belt 606 that is an object for scanning (scanning object).

In the case that the optical system 600 is employed in a digital copier, for example, intensity of the light beam from the semiconductor laser 601 is modulated according to an image to be copied. By focusing the light beam on the surface of the photo conductor belt 606, an electrostatic latent image of the image to be copied is formed. Therefore, a scanning accuracy in the scanning direction, the scanning speed and the like of the laser scanning optical system 605 are critically important in obtaining a high quality copying. That is, an accuracy of the shape of each of the scanning lenses 605a, 605b and 605c is critically important.

As described, the scanning lenses 605a, 605b and 605c used in the optical system 600 of the present embodiment are produced by using the injection mold that is produced according to the production method of the present invention. Therefore, reliable realization of designed optical properties is enabled, that is, conversion of the light beam of the uniform angular velocity from the rotating polygon mirror 604 to the light beam (scanning beam) of the uniform velocity is accurately performed. In this manner, an accurate reproduction of an image to be copied is realized.

Figure 29:
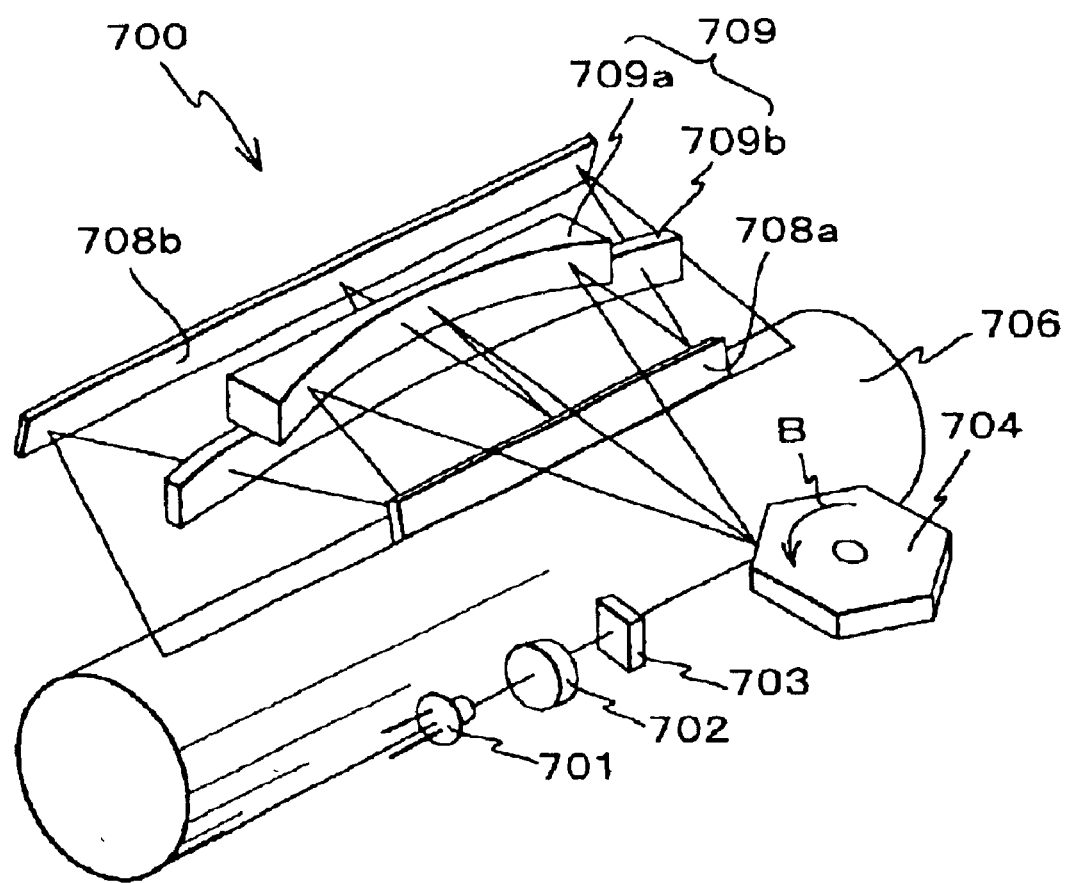
FIG. 29 is a figure for explaining a second embodiment of the optical system of the present invention.

Next, a second embodiment of the optical system of the present invention is explained based on FIG. 29. FIG. 29 shows an outline configuration of an optical system 700, serving as the second embodiment of the present invention. The optical system 700 includes a semiconductor laser 701 as a light source emitting a light beam, a rotating polygon mirror 704 having a deflecting surface that deflects the optical beam from the semiconductor laser 701 in a uniform angular velocity, a laser scanning optical system 709 that coverts the light beam deflected by the rotating polygon mirror 704 in the uniform angular velocity to a light beam in a uniform velocity, and a reflection mirror 708b that changes a course of the light beam from the laser scanning optical system 709. Here, the laser scanning optical system 709 is structured by a scanning mirror 709a and a scanning lens 709b, both of which are molded by the injection mold produced according to the production method of the present invention.

Here, operations of the optical system 700 are briefly explained. The light beam emitted from the semiconductor laser 701 passes through a lens 702 and a lens 703, and reaches the rotating polygon mirror 704, forming an image nearby the deflecting surface. The rotating polygon mirror 704 rotates at a fixed speed in the direction indicated by an arrow B. The image that is formed nearby the deflection surface is deflected in a uniform angular velocity, according to the rotation. The deflected optical beam passes through the scanning mirror 709a and the reflecting mirror 708b, then is input to the scanning lens 709b such that the optical beam is converted to a uniform velocity optical beam on the surface of the reflecting mirror 708b over a predetermined angle range in the longitudinal direction of the reflecting mirror 708b. The optical beam reflected by the reflecting mirror 708b scans the surface of a photo conductor belt 706 that is an object of scanning.

The scanning mirror 709a and the scanning lens 709b of the optical system 700 are produced by the injection mold according to by the production method of the injection mold of the present invention. For this reason, the optical system 700 can surely realize the designed optical properties, that is, the uniform angular velocity optical beam can be converted to the uniform velocity optical beam that scans the scanning object. Accordingly, an accurate reproduction of the image to be copied is realized.

Next, a third embodiment of the optical system of the present invention is explained.

Figure 30:
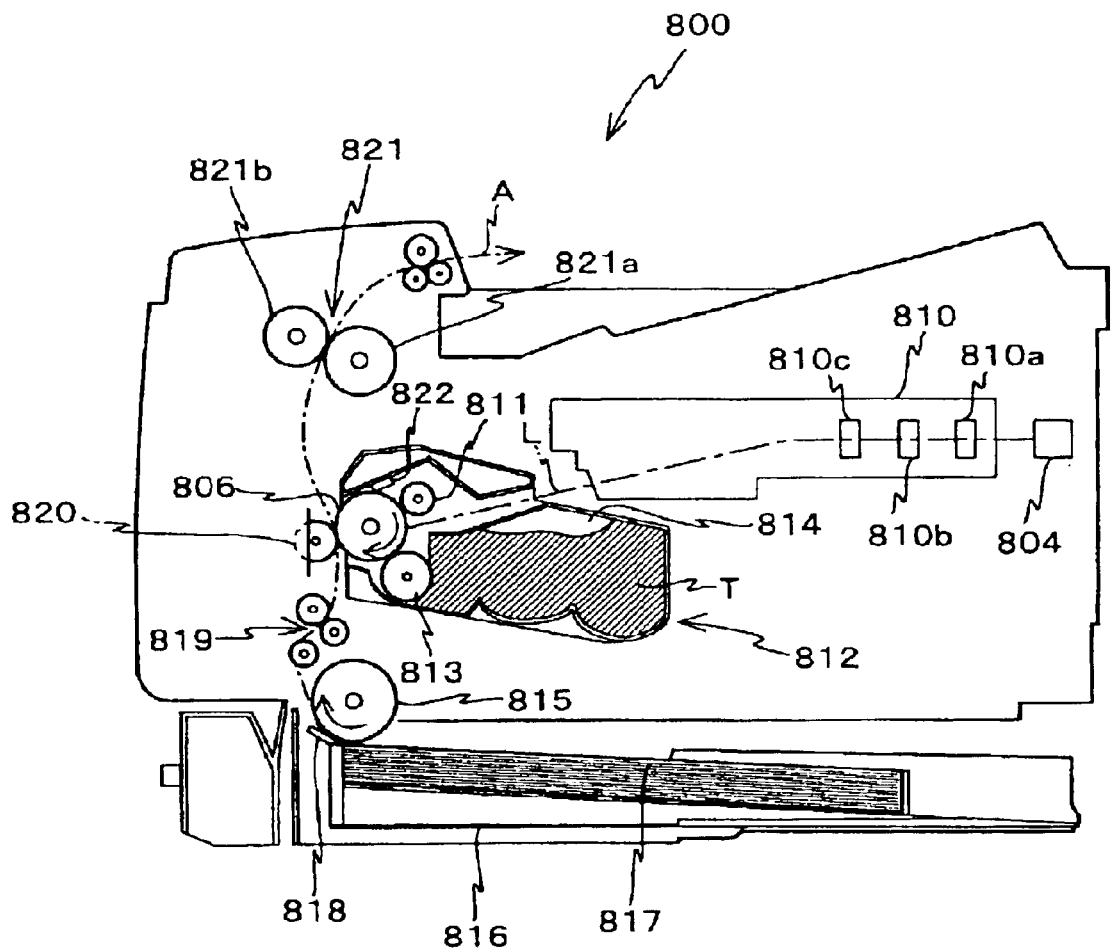
FIG. 30 is a figure for explaining a third embodiment of the optical system of the present invention, implemented as an image forming apparatus.
Figure 31:
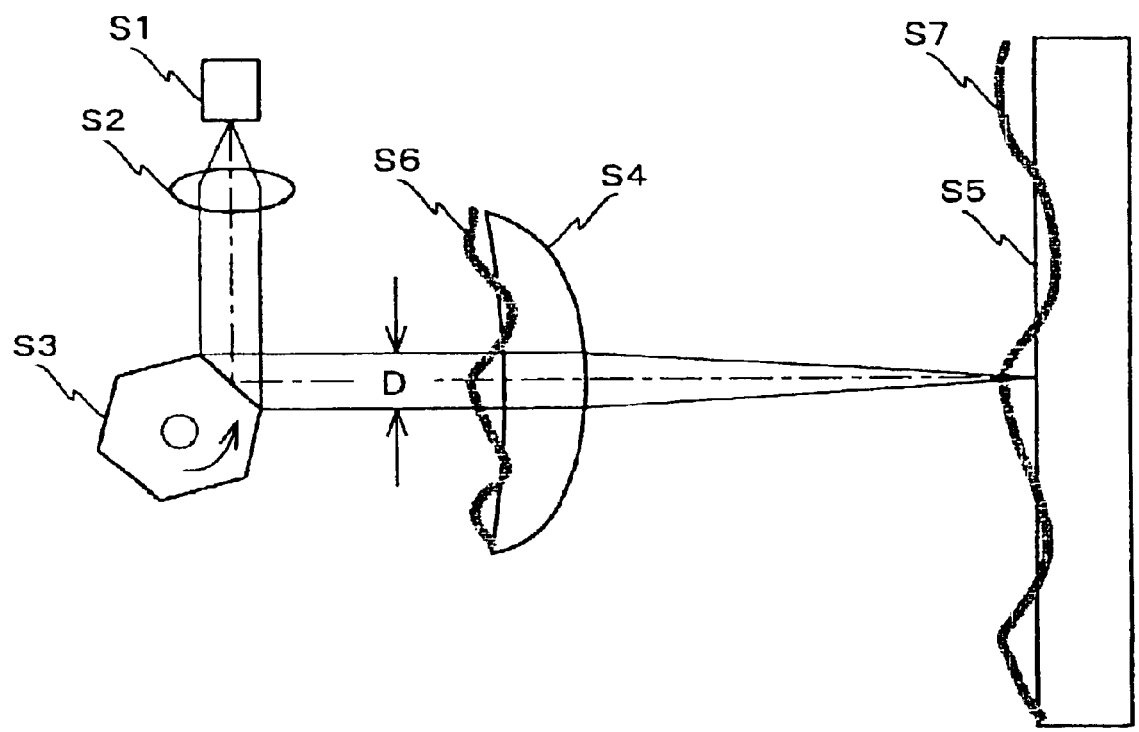
FIG. 31 is a figure for explaining a relationship between a space wavelength of shape errors and a focal deviation of a lens.

FIG. 30 shows an outline configuration of a laser beam printer 800 that is an image formation apparatus as the third embodiment of the optical system of the present invention.

The laser beam printer 800 includes a photo conductor drum 806 having a photo conductor layer on its surface, which serves as an image-bearing object, a laser light source 804 that emits a laser beam containing image information, a scanning optical system 810 that scans the light beam from the laser light source 804 such that an electro-static latent image of the image information is formed on the surface of the photo conductor drum 806, a developing unit 812 that develops the electrostatic latent image such that a toner image is formed, a copying unit 820 serving as a copying means, and a thermal fixing unit 821 that fixes the toner image on a sheet of paper.

Here, the scanning optical system 810 includes scanning lenses 810a, 810b, and 810c that are produced by the production method of the injection mold of the present invention. The development unit 812 includes a toner chamber 814 that stores toner T, and a development sleeve 813 that applies the toner T stored in the toner chamber 814 to the surface of the photo conductor drum 806. Further, the thermal fixing unit 821 includes a fixing roller 821a that contains a heater (not shown), and a pressurization roller 821b. The pressurization roller 821b is pressed against the fixing roller 821a by a biasing means that is not shown.

Here, operations of the laser beam printer 800 are briefly explained. When a power supply is turned on, and various preparatory processes such as checking toner quantity are completed, the laser printer 800 comes into a standby mode. Here, the photo conductor drum 806 rotates clockwise, that is, in the direction of an arrow in FIG. 30, and the surface of the drum is uniformly charged by a roller type charging unit 811. The laser light source 804 emits a laser beam that is intensity-modulated according to image information that is input to an inputting means (not shown) from an image generating apparatus (not shown) such as a computer. The intensity-modulated laser beam is deflected by a deflecting means (not shown), is supplied to the scanning optical system 810, then to the scanning lenses 810a, 810b and 810c, and is converted to a laser beam having a fixed velocity in a predetermined angle range in the longitudinal direction of the photo conductor drum 806. When the laser beam L reaches the surface of the photo conductor drum 806, a status of electric charging of the drum surface changes, such that an electrostatic latent image according to the image information is formed.

Further, the toner T is applied to electric-charged parts of the drum surface via the development sleeve 813 with rotation of the photo conductor drum 806. In this manner, the electrostatic latent image formed on the surface of the photo conductor drum 806 is developed, and the toner image is obtained.

Paper 817 stored in a feed cassette 816 is transported by a feed roller 815 and a biasing means that is not shown. One sheet of the paper is separated by a separating pad 818, is transported to a front face of a resist roller pair 819, and stands by there.

When the resist roller pair 819 starts rotating in synchronous with the development process of the electrostatic latent image, the sheet of the paper is transported to the copying unit 820 that is of a roller type. At the copying unit 820, the toner image on the surface of the photo conductor drum 806 is copied to the sheet of the paper.

Then, the sheet of the paper is transported to the thermal fixing unit 821, and a heat and a pressure are applied as the sheet of the paper is passing between a fixing roller 821a and a pressurization roller 821b. In this manner, the toner image is fixed to the sheet of the paper.

Then, the paper is output in the direction indicated by an arrow A in FIG. 30, with the image side down, and stacked one by one on the main body of the laser beam printer 800. After copying the toner picture to the paper, the photo conductor drum 806 keeps rotating, and a cleaning blade 822 removes residual toner on the drum surface, such that the photo conductor drum 806 is prepared for next electric charging.

Quality of the image copied depends on a scanning accuracy of the scanning optical system 810. That is, in order to form a high quality image, the laser beam from the laser source 804 has to be able to form the image on the surface of the photo conductor drum 806 with an accurate focus, an accurate scanning direction and a constant scanning velocity.

The laser beam printer 800 of the present embodiment uses the scanning lenses 810a, 810b and 810c that are produced by using the injection mold produced by the production method of the injection mold of the present invention, such that an amount of the shape errors that adversely affect designed optical properties is reduced, and that the designed optical properties can surely be realized. As the result, an accurate scanning is possible to form a high-quality image.

Here, the scanning optical system 810 does not necessarily include three scanning lenses. It is also possible that the scanning optical system 810 includes a component other than lenses, such as a scanning mirror.

As described above, the production method and the production system of the injection mold of the present invention realizes an efficient production of an injection mold that can mold a component capable of surely realizing designed properties, because a wavelength component of shape errors that adversely affect the properties of the component is selectively reduced.

Further, by using the injection mold of the present invention, a stable molding of a component that surely realizes the designed properties is possible, because the molding part is processed based on the processing information that selectively reduces a wavelength component of the shape errors that adversely affect the properties of the molded component.

Further, by using the molding method of the present invention, a stable molding of a component that surely realizes the designed properties is possible, because the molding part is processed based on the processing information that selectively reduces a wavelength component of the shape errors that adversely affect the properties of the molded component. Further, according to the designing apparatus and the designing computer program of the injection mold of the present invention, an efficient designing of an injection mold that molds a component that surely realizes the designed properties is possible, because the processing information that selectively reduces a wavelength component of the shape errors that adversely affect the properties of the molded component is generated.

Moreover, by using a molded component and an optical component of the present invention, the designed properties are surely realized, because the molded component and the optical component is produced by using the injection molding that is processed based on the processing information that selectively reduces a wavelength component of the shape errors that adversely affect the properties of the molded component and the optical component.

Further, according to the optical system of the present invention, the optical component that has excellent optical properties is used, enabling to enhance the scanning accuracy.

Further, the present invention is not limited to these embodiments, but various variations and modifications may be made without departing from the scope of the present invention.

The present application is based on Japanese priority applications No. 2001-185547 filed on Jun. 19, 2001 and No. 2002-077509 filed on Mar. 20, 2002 with the Japanese Patent Office, the entire contents of which are hereby incorporated by reference.

What is claimed is:

1. A production method of producing an injection mold that produces a molded component by copying a surface shape of a cavity of a molding part of the injection mold, having a predetermined shape, comprising:

a first process that extracts a plurality of wavelength components of shape errors contained in the molded component, based on at least one of the surface shape of the cavity of a first molding part and a shape of the molded component that is molded by using the first molding part; and a second process that generates processing information that is used in processing a surface shape of a cavity of a second molding part such that an amount of at least one of the plurality of the wavelength components extracted in the first process is reduced.

2. The method of producing an injection mold as claimed in claim 1, wherein the plurality of the wavelength components include a first wavelength component and a second wavelength component;

the first wavelength component is extracted in the first process, based on the surface shape of the cavity of the first molding part; and the second wavelength component is extracted in the first process, based on the shape of the molded component.

3. The method of producing an injection mold as claimed in claim 1, wherein a wavelength of the first wavelength component is longer than a wavelength of the second wavelength component.

4. The method of producing an injection mold as claimed in claim 1, wherein the plurality of the wavelength components comprise a first wavelength component and a second wavelength component;

the first process extracts the first wavelength component based on shape errors in a first direction; and the first process extract the second wavelength component based on shape errors in a second direction that is different from the first direction.

5. The method of producing an injection mold as claimed in claim 4, wherein the first direction and the second direction are orthogonal.

6. The method of producing an injection mold as claimed in claim 1, wherein phase errors of points where no measurement has been made are interpolated based on shape errors of points where a measurement is performed.

7. The method of producing an injection mold as claimed in claim 1, wherein the plurality of the wavelength components comprise a first wavelength component, a second wavelength component, and a third wavelength component;

the first wavelength component, the second wavelength component, and the third wavelength component of the shape errors are extracted in the first process; and the second process generates processing information that is to be used in processing the surface shape of the cavity of the second molding part such that an amount of at least one of the first wavelength component, the second wavelength component, and the third wavelength component is reduced.

8. The method of producing an injection mold as claimed in claim 7, wherein the first wavelength component and the second wavelength component are extracted from the shape error in a first direction, and the third wavelength component is extracted from the shape error in a second direction that is different from the first direction, at the first process.

9. The method of producing an injection mold as claimed in claim 8, wherein the first wavelength component is a wavelength component of longer than 10 mm in wavelength, and is obtained based on the shape of the component molded by using the first molding part;

the second wavelength component is a wavelength component of shorter than 20 mm in wavelength, and is obtained based on the surface shape of the cavity of the first molding part; and the third wavelength component is an error component of radius of curvature, which is obtained based on the shape of the molded component that is molded by the first molding part.

10. The method of producing an injection mold as claimed in claim 1, wherein the first process extracts a wavelength component obtained as a difference between a shape regression formula obtained from measurement values of the shape of the molded component, and a designed shape formula of the molding part; and a wavelength component, which is different from the wavelength component referred to immediately above, that is obtained by band-pass filtering a difference between the measurement values of the surface shape of the cavity of the first molding part, and a shape regression formula obtained by the measurement values.

11. The method of producing an injection mold as claimed in claim 1, wherein a compensation amount is calculated for the surface shape of the cavity of the first molding part, using a compensation amount of the molded component molded by using the first molding part, which is obtained based on at least one of the plurality of the wavelength components, and a contraction ratio of a raw molding material in at least one direction; and processing information for processing the surface shape of the cavity of the second molding part, based on the compensation amount, is generated.

12. The method of producing an injection mold as claimed in claim 11, wherein, if the compensation amount for the molded component is expressed as z=f(x,y) in an XYZ coordinate, the compensation amount for the surface shape of the cavity of the first molding part is expressed by one of $Z_k=-f(-m_x\ x, m_y\ y)/m_z$, and $Z_k=-f(m_x\ x, -m_y\ y)/m_z$, where each of $m_x$, $m_y$, and $m_z$ represents a contraction ratio in each of X, Y, and Z-directions, respectively.

13. The method of producing an injection mold as claimed in claim 1, further comprising a third process that processes the surface shape of the cavity of the second molding part.

14. The method of producing an injection mold as claimed in claim 13, wherein the third process processes the surface shape of the cavity of the first molding part, and make the processed first molding part the second molding part.

15. The method of producing an injection mold as claimed in claim 14, wherein said process is performed by one of a cutting process by a single crystal diamond byte and a polishing process where a polishing tool contacts a surface to be processed in an area smaller than 3 mm in diameter.

16. An injection mold that is produced according to the method of producing the injection mold, as claimed in claim 1.

17. A method of injection molding, wherein the injection mold as claimed in claim 16 is used such that a component is molded by copying the surface shape of the cavity of the molding part provided in the injection mold, under a predetermined molding condition that yields a stable shape of the molded component.

18. A designing apparatus for designing an injection mold that produces a molded component by copying a surface shape of a cavity of a molding part of the injection mold, having a predetermined shape, comprising:

a shape inputting unit that inputs measurement data of at least one of the surface shape of the cavity of the molding part and a shape of the molded component to which the surface shape is copied;

an error component extracting unit that extracts a plurality of wavelength components of shape errors contained in the molded components, based on the measurement data; and a processing information generating unit that generates processing information that is to be used in processing of the surface shape of the cavity of the molding part such that at least one of the plurality of the wavelength components is reduced.

19. A computer program for designing an injection mold that produces a molded component by copying a surface shape of a cavity of a molding part of the injection mold, having a predetermined shape, the computer program being executed by a computer for designing, comprising:

an extracting step that extracts a plurality of wavelength components of shape errors contained in the molded component, based on measurement data of at least one of the surface shape of the cavity of a first molding part and a shape of the molded component that is molded by using the first molding part; and a processing information generating step that generate processing information that is used in processing a surface shape of a cavity of the molding part such that the amount of at least one of the plurality of the wavelength components extracted in the first process is reduced.

20. A production system for producing an injection mold that produces a molded component by copying a surface shape of a cavity of a molding part of the injection mold, having a predetermined shape, comprising:

an information generating apparatus that extracts a plurality of wavelength components of shape errors contained in the molded component, based on at least one of the surface shape of the cavity of a first molding part and a shape of the molded component that is molded by using the first molding part, and generate processing information to be used in processing the surface shape of a second molding part such that an amount of at least one of the plurality of the wavelength components is reduced; and a processing machine the processes the surface shape of the cavity of the second molding part, based on the processing information.

21. The production system as claimed in claim 20, further comprising a shape measuring apparatus that measures at least one of the surface shape of the cavity of the first molding part and the shape of the molded component moldered by using the first molding part, and outputs a measuring result to the information generating apparatus.

22. A molded component that is molded by copying to a molding material the surface shape of the cavity of the molding part that forms the cavity of the injection mold, by using the injection mold as claimed in claim 16.

23. An optical component that is molded by copying to a molding material the surface shape of the cavity of the molding part that forms the cavity of the injection mold, by using the injection mold as claimed in claim 16.

24. The optical component as claimed in claim 23, wherein a plurality of processing marks are copied to the molding material.

25. The optical component as claimed in claim 24, wherein a first set of the processing marks is copied at a peripheral of an optical surface in a longitudinal direction, and a second set of the processing marks that are finer in pitch than the first set of the processing marks are copied inside the peripheral in a predetermined angle against the longitudinal direction.

26. The optical component as claimed in claim 23, wherein an absolute value A of a shape error, which is band-pass filtered to contain the shape error in a wavelength range of between 0.5 xD and 1.5 xD, falls in a range $0.00001 \times W <= A =< 0.0005 \times W$, where D represents a diameter of a light flux input to the molded component, having a light intensity greater than $1/e^2$ where the light intensity at a center of the light flux is set at 1, and W represents a diameter of the light flux at a focal point, when a light flux characterized by the diameter D is input to the optical component.

27. The optical components as claimed in claim 26, wherein an attenuation ratio of the band-pass filtering is equal to or smaller than −12 dB/octave.

28. An optical system comprising an optical scanning system that scans a scanning object with a light beam from a light source, wherein the optical scanning system comprises:

a deflecting unit that deflects the light beam from the light source in a predetermined angle range; and an optical unit that comprises an optical component as claimed in claim 23.

29. The optical system as claimed in claim 28, wherein the scanning object is an image-bearing object on which an image is formed by irradiation of the light beam through said optical system, and further comprises copying means by which the image is copied to a copying object.

* * * * *